United States Patent
Kogure et al.

(10) Patent No.: US 8,204,271 B2
(45) Date of Patent: Jun. 19, 2012

(54) DIGITAL WATERMARK DETECTING APPARATUS

(75) Inventors: Nakada Kogure, Kanagawa (JP); Tomoo Yamakage, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 931 days.

(21) Appl. No.: 12/235,196

(22) Filed: Sep. 22, 2008

(65) Prior Publication Data

US 2009/0089585 A1  Apr. 2, 2009

(30) Foreign Application Priority Data

Oct. 2, 2007 (JP) ................. 2007-258893

(51) Int. Cl.
*G06K 9/00* (2006.01)

(52) U.S. Cl. ........ 382/100; 380/200; 380/201; 380/202; 380/203; 380/204; 358/426.01; 358/426.02; 358/426.03; 358/426.04; 358/426.05; 354/555; 375/122; 375/240.01; 375/240.02; 375/240.03; 375/240.04

(58) Field of Classification Search .......... 382/100, 382/232–253; 380/200–242; 358/426.01–426.16; 354/555; 348/384.1–440.1; 375/122, 240.01–240.29
See application file for complete search history.

(56) References Cited

U.S. PATENT DOCUMENTS

| | | | |
|---|---|---|---|
| 6,741,723 | B2 | 5/2004 | Yamakage et al. |
| 7,284,130 | B2 | 10/2007 | Asano et al. |
| 2004/0117629 | A1 | 6/2004 | Koto et al. |
| 2005/0053259 | A1 | 3/2005 | Asano et al. |
| 2006/0204030 | A1 | 9/2006 | Kogure et al. |
| 2006/0204031 | A1 | 9/2006 | Kogure et al. |
| 2007/0195988 | A1 | 8/2007 | Kogure et al. |

FOREIGN PATENT DOCUMENTS

JP  2006-254147  9/2006

*Primary Examiner* — Atiba O Fitzpatrick
(74) *Attorney, Agent, or Firm* — Oblon, Spivak, McClelland, Maier & Neustadt, L.L.P.

(57) ABSTRACT

A digital watermark embedding apparatus includes: an extractor configured to extract a specific frequency component from each of N kinds of scaled images about an input image signal to generate N kinds of extracted signals; a generator configured to compress the amplitude of the respective extracted signals on the basis of N kinds of to-be-embedded information corresponding to the N kinds of extracted signals to generate watermark image signals by shifting the predetermined phases; and a superimposer configured to add the N kinds of watermark image signals to the input image signal to generate an output image signal.

12 Claims, 19 Drawing Sheets

DIGITAL WATERMARK DETECTING APPARATUS

CROSS-REFERENCE TO RELATED APPLICATIONS

This application is based upon and claims the benefit of priority from the prior Japanese Patent Application No. 2007-258893, filed on Oct. 2, 2008; the entire contents of which are incorporated herein by reference.

TECHNICAL FIELD

The present invention relates to a digital watermark embedding apparatus and a digital watermark detecting apparatus effective for preventing a false copy of, for example, a digital moving image signal provided via a recording medium.

BACKGROUND OF THE INVENTION

Owing to the progress of apparatuses for recording and reproducing digital image data such as a digital VTR or a DVD (Digital Versatile Disk), a number of digital moving images which can be reproduced by these apparatuses are now provided. Also, various digital moving images are distributed via a digital television broadcast via an internet, a broadcasting satellite, or a communication satellite and users are becoming able to use high-quality digital moving images.

The digital moving image is able to be copied at high-quality easily at a digital signal level, and has a possibility to be copied limitlessly unless it is protected by some copy prohibition or copy control measures. Therefore, in order to prevent a false copy of the digital moving image or to control the number of generation of copy by authorized users, there is contemplated a method of adding information for controlling the copy to the digital moving image, preventing false copy using the added information, and limiting the copy.

As a technology to superimpose separate additional information on the digital moving image as described above, a digital watermark is known. The digital watermark is a technology to embed information such as a copyright of a content, identification information of users, right information of copy right holder, conditions of usage of contents, confidential information required when it is used, and copy control information as described above (hereinafter, referred to as watermark information) in the digitalized contents such as sounds, music, moving images, and still images in a hardly recognizable manner, and detecting the watermark information from the contents as needed to achieve copyright protection including usage control and copy control and promotion of secondary usage.

A typical example of the false copy is DVDs of pirated edition. Many of the DVDs of pirated edition are made by audiences by shooting an image projected on a screen by a video camera in a theater and generating DVDs from the shot image. In order to prevent the false copy of this type, copy or reproduction control information or an image ID is embedded in a movie film in advance as a digital watermark, and the digital watermark information (control information or the image ID) embedded therein is detected from the image shot by the video camera, thereby controlling the copy or reproduction or tracing the false copy on the basis of the detected control information.

Here, embedding of the digital watermark information in the movie film will be considered. In recent years, digitalization is in progress in the process of making a movie film, and generally, some digital transformation such as transforming the film into a digital signal once, editing the digital signal in a studio, and restoring the finished digital signal into a film is performed when preparing movie materials. Therefore, by embedding the digital watermark information in the digital signal in the process of preparing the movie film, the digital watermark information can be embedded in the movie film.

In order to use the digital watermark as a measure to prevent the false copy by private shooting in the theater as described above, it is important to have a resistance against geometry deformation (geometrical deformation occurring in the process from the projection of a movie film having the digital watermark information embedded therein on the screen until the shooting of the movie film by the video camera), and a frame jitter (temporal displacement generated by the individual difference in rotational velocity of the film projector).

Various digital watermark methods are proposed, and one of the methods of providing the digital watermark is a method in which a technology of spectrum diffusion is applied is known. In this method, the watermark information is embedded in the digital moving image in the following procedure.
[Step E1]
Spectrum diffusion is achieved by multiplying an image signal by PN (Pseudorandom Noise) series.
[Step E2]
An image signal after the spectrum diffusion is transformed in frequency (for example, DCT transform).
[Step E3]
Watermark information is embedded by changing the value of a specific frequency component.
[Step E4]
An inverse frequency transform (for example, IDCT transform) is performed.
[Step E5]
Inverse spectrum diffusion is performed (the same PN series as in Step E1 is multiplied).

On the other hand, detection of the watermark information from the digital moving image having the watermark information embedded therein as described above is achieved in the following procedure.
[Step D1]
The image signal is multiplied by the PN series (the same PN series as in Step E1) to achieve the spectrum diffusion.
[Step D2]
The image signal after the spectrum diffusion is transformed in frequency (for example, DCT transform).
[Step D3]
The value of the specific frequency component is targeted and watermark information embedded therein is extracted.

As one of methods of embedding a digital watermark for moving image for embedding an image signal according to the watermark information, a technology to embed a digital watermark signal in an input image signal by generating a digital watermark signal using a specific frequency component signal extracted from the input image signal is proposed, and this method has a strong resistance against the geometry deformation (for example, see Claim 1, FIG. 1 in JP-A-2005-68556 (KOKAI)).

When applying the digital watermark aiming the prevention of the false usage, it is necessary to have a nature which resists loss or alteration of the watermark information resulted from various general operations which are likely applied to the digital copyright production or intended attack applied thereto (robustness). As an attack to disable detection of the watermark information with respect to the digital image having the watermark information embedded therein, there is cutting out of the image, scaling (enlargement/contraction), or the like.

In the related art in which the technology of spectrum diffusion is applied, when the image subjected to the attack as described above is input, the process of estimating the PN series used in Step E1 for embedding is performed when detecting the watermark information to restore the synchronism of the PN series, and the processes in Steps D1 to D3 are performed, so that the embedded watermark information is extracted. However, in order to restore the synchronism of the PN series only from the image signal, it is necessary to perform a search by trying the process with a plurality of candidates and employing the well detected result. Therefore, there is a problem of increase in amount of calculation and the scale of the circuit. Also, since the watermark information is weakened in the attacked image, there is a problem such that even when the cutting out or scaling of image is found and the detection corresponding thereto is tried, the watermark information cannot be detected.

In contrast, a technology of embedding a digital watermark signal on the basis of the specific frequency component signal extracted from the input image signal for embedding and detecting the specific frequency component signal equivalent to the embedded side extracted from the input image signal at the time of detection is known to have a resistance against the geometry deformation, but the embedded position having the resistance against the geometry deformation is limited, and hence it is difficult to embed a plurality of to-be-embedded information at specific positions having resistance against the geometry deformation.

BRIEF SUMMARY OF THE INVENTION

Accordingly, it is an object of the invention to provide a digital watermark embedding apparatus and a digital watermark detecting apparatus which is able to embed and detect a plurality of embedded information one on top of another.

According to embodiments of the invention, there is provided a digital watermark embedding apparatus including: a scaling unit configured to enlarge or contract an input image signal at N (N>1) kinds of different enlargement ratios or contraction ratios to generate N kinds of scaled images; an extractor configured to extract a specific frequency component from each of the N kinds of scaled images to generate N kinds of extracted signals; a generator configured to generate N kinds of watermark image signals by compressing the amplitude of the respective extracted signals on the basis of N kinds of to-be-embedded information corresponding to the N kinds of extracted signals and by shifting the predetermined phases; and a superimposer configured to add the N kinds of watermark image signals to the input image signal to generate an output image signal.

There is also provided a digital watermark detecting apparatus including: a scaling unit configured to enlarge or contract an input image signal having N kinds of embedded information embedded therein at N kinds of different enlargement ratios or contracting ratios to generate N kinds of scaled images; an extractor configured to generate N kinds of extracting signals by extracting specific frequency component signals respectively from the N kinds of scaled images; a first orthogonal transformer configured to perform an orthogonal transform on the input image signal to generate a first transforming signal; a second orthogonal transformer configured to perform the orthogonal transform on the N kinds of extracted signals respectively to generate N kinds of second transforming signals; a synthesizer configured to synthesize the first transforming signals and the N kinds of second transforming signals respectively to generate N kinds of synthesized images; a third orthogonal transformer configured to perform the orthogonal transform or inverted orthogonal transform on the N kinds of synthesized images respectively to generate N kinds of third transforming signals; and an estimator configured to estimate the N kinds of embedded information from peaks appearing in the N kinds of third transforming signals.

According to the invention, embedding of a larger amount of information is enabled while maintaining the resistance against a geometry deformation.

DETAILED DESCRIPTION OF THE INVENTION

Figure 1:
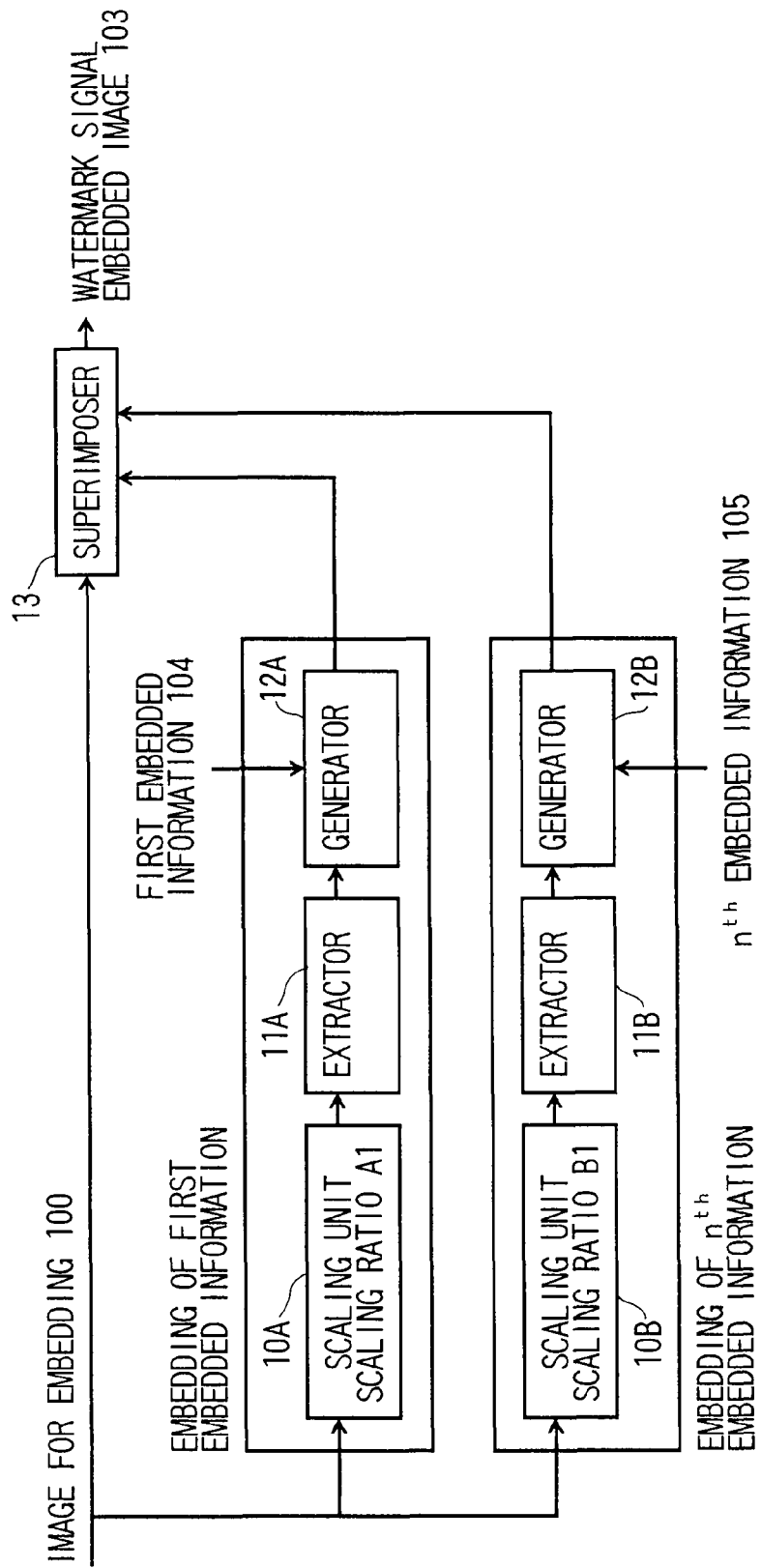
FIG. 1 is a block diagram showing a configuration of an embedding apparatus according to a first embodiment of the invention.

A digital watermark embedding apparatus (hereinafter, referred to simply as "embedding apparatus") and a digital watermark detecting apparatus (hereinafter, referred to simply as "detecting apparatus") of the invention will be described respectively, and then the both will be described finally together.

Embodiment of Embedding Apparatus

Referring now to the drawings, an embedding apparatus will be described.

First Embodiment

Figure 13:
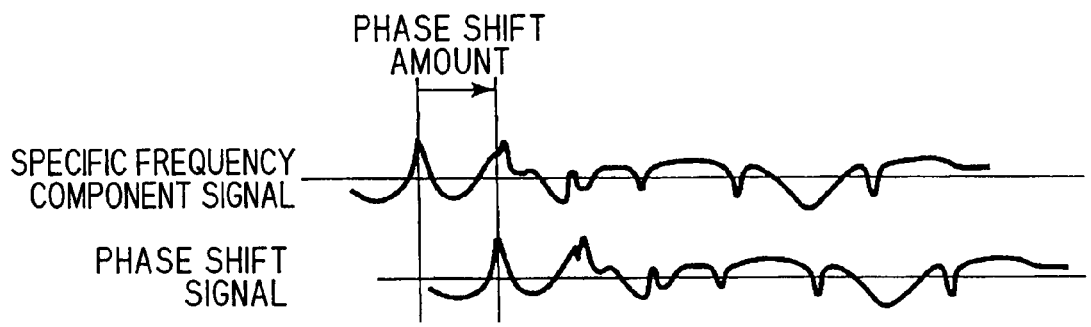
FIG. 13 is a drawing for explaining a phase shift of a specific frequency component signal by a phase controller according to the first embodiment.

Referring now to FIG. 1 and FIG. 13, an embedding apparatus according to a first embodiment will be described.

FIG. 1 is a block diagram showing a basic configuration of the embedding apparatus.

The embedding apparatus includes a scaling unit 10, a specific frequency extractor (hereinafter, referred to simply as "extractor") 11, a watermark signal generator (hereinafter, referred to simply as "generator") 12, and a watermark signal superimposer (hereinafter, referred to simply as "superimposer") 13.

An operation of the embedding apparatus will be described.

In this example, N (N>1) kinds of to-be-embedded information are embedded, and the number of bits in each kind is M bits (M=>1). However, the number of bits may vary depending on the kinds. Therefore, the invention may be applied both to a case in which the kinds are different on the bit-to-bit basis (a case in which one bit constitutes one kind) and a case in which a plurality of bits constitute one kind.

A digitalized image signal of a moving image or a still image is input to the embedding apparatus as an image in which watermark information is to be embedded (image for embedding 100). The image for embedding 100 may include both a luminous signal and a color difference signal, but may include only the luminous signal.

The image for embedding 100 inputs to the embedding apparatus is input to the scaling unit 10 and the superimposer 13 for each of the plurality of to-be-embedded information. Then, embedding from first to-be-embedded information to $n^{th}$ to-be-embedded information is performed. The sign "n" in the $n^{th}$ to-be-embedded information is two or more. The embedding of the first to-be-embedded information will be described.

First of all, a scaling unit 10A contracts (or enlarges) the image for embedding 100 at a scaling ratio A1. This signal is input to the extractor 11A. The term "enlarge and contract" in this specification means increasing and reducing the size of the image.

Then, an extractor 11A extracts a specific frequency component which is equivalent to that at the time of detection. The extractor 11A includes, for example, a low-pass filter or a high-pass filter having a predetermined cut-off frequency, or a band-pass filter having a predetermined pass-band center frequency, and extracts a specific frequency component equivalent to the detecting side from the contracted (or enlarged) signal, for example, a relatively high frequency component by the scaling unit 10A. Hereinafter, the output signal from the extractor 11A is referred to as "specific frequency component signal". A filter used for embedding may be a filter completely the same filter as that used for detection.

Then, a generator 12A generates a watermark image signal on the basis of the specific frequency component signal and the watermark information (first to-be-embedded information 104) outputted from the extractor 11A. The first to-be-embedded information 104 is a signal train of digital signals "1" or "0".

In the same manner, watermark image signals are generated for embedding a plurality of to-be-embedded information.

For example, when embedding the $n^{th}$ to-be-embedded information, the signal contracted (or enlarged) by a scaling unit 10B at a scaling ratio B1 is input to an extractor 11B. The scaling ratios A1 and B1 are different values.

Then, the extractor 11B extracts the specific frequency component which is equivalent to that at the time of detection. The filter used for embedding may be the filter completely the same as that used for detection.

Then, a generator 12B generates a watermark image signal on the basis of the specific frequency component signal outputted from the extractor 11B and $n^{th}$ to-be-embedded information 105. The $n^{th}$ to-be-embedded information 105 is a signal train of digital signals "1" or "0".

Finally, the superimposer 13 receives a supply of the watermark image signal generated by the generators 12A and 12B. The superimposer 13 includes a digital adder, and superimposes the watermark image signal with the image for embedding 100 to generate a watermark signal embedded image 103.

Subsequently, the generators 12A and 12B are described. The following processes are performed for each of the N kinds of to-be-embedded information to generate N kinds of watermark image signals.

The watermark information includes a plurality of bits data.

First of all, embedding positions corresponding to the respective bits of the watermark information are set on the enlarged (or contacted) input image.

Then, the amplitudes of the specific frequency component signals (output signals from the extractors 11A and 11B) are compressed according to the amount of characteristic of the input image according to the respective bit values (for example, reduces the amplitude at a flat section and increases the amplitude near the edge, so that it can hardly be recognized).

Then, the compressed signals are superimposed at preset positions so that the watermark image signal is generated.

Specifically, the process is as follows.

First of all, the setting of the position is realized by a single or a plurality of digital phase shifters.

The amount of positional shift corresponds to the amount of phase shift of the phase shifter.

FIG. 13 is a drawing showing a state of the phase shift. In this example, the specific frequency component signal is simply shifted in phase (position) while maintaining the waveform. The amplitude control is performed specifically by a single or a plurality of exclusive OR circuits or digital multipliers, and the sign or the magnitude at the time of amplitude control is controlled according to the plurality of to-be-embedded information or activities which represent complexity of the image and, when it is expressed simply, becomes a coefficient (embedding strength) to be multiplied by the input specific frequency component signals having the contents as described above. For example, the larger the activity is, the larger the coefficient to be set becomes.

Since the scaling ratios A1 and B1 are different values, embedding of a larger amount of information is enabled by embedding a plurality of kinds of to-be-embedded information to a specific position in a superimposed manner.

Since the positions having the resistance against the geometry deformation for embedding are limited, by embedding a larger amount of information into a specific position having the resistance against the geometry deformation in a superimposed manner according to this method, resistance against the geometry deformation is achieved.

Second Embodiment

Figure 2:
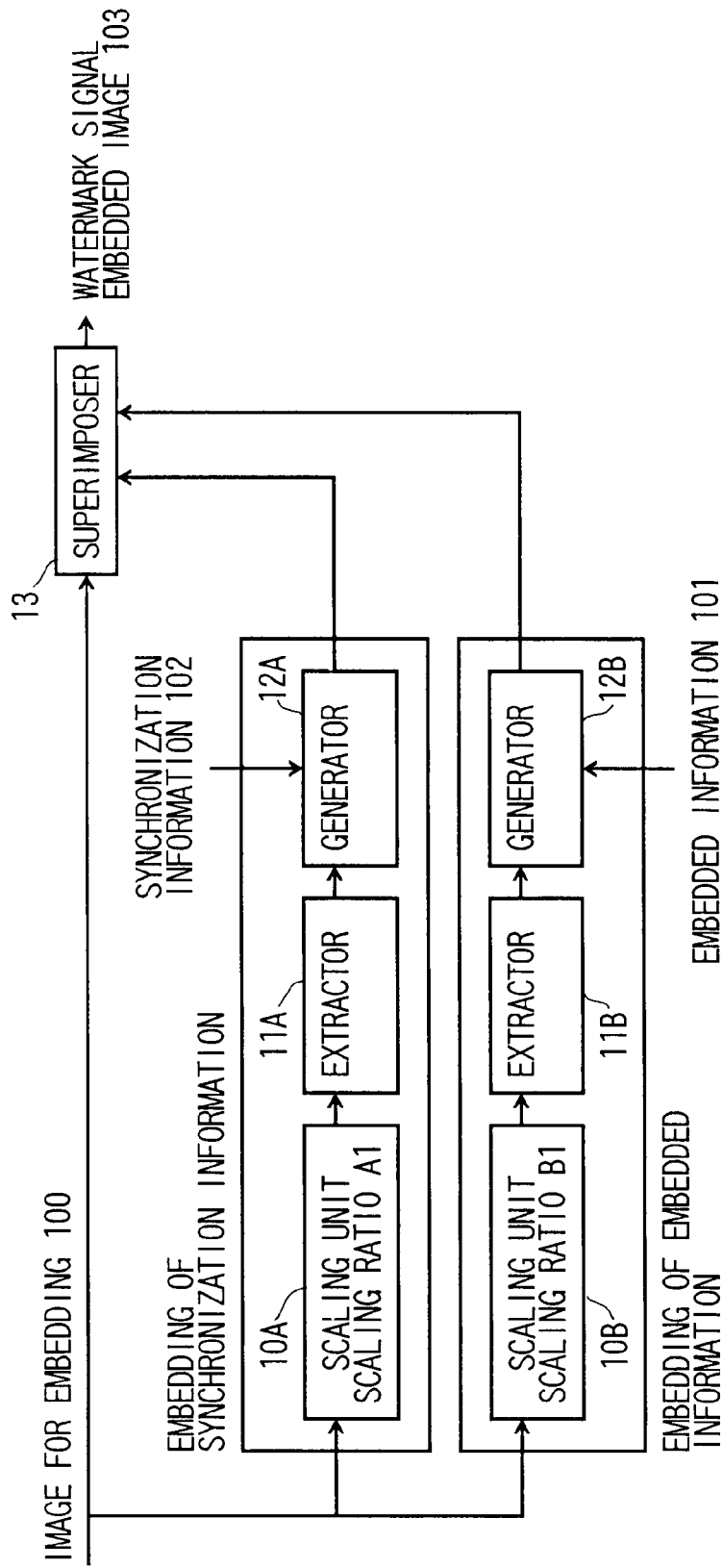
FIG. 2 is a block diagram showing a configuration of the embedding apparatus according to a second embodiment.
Figure 4:
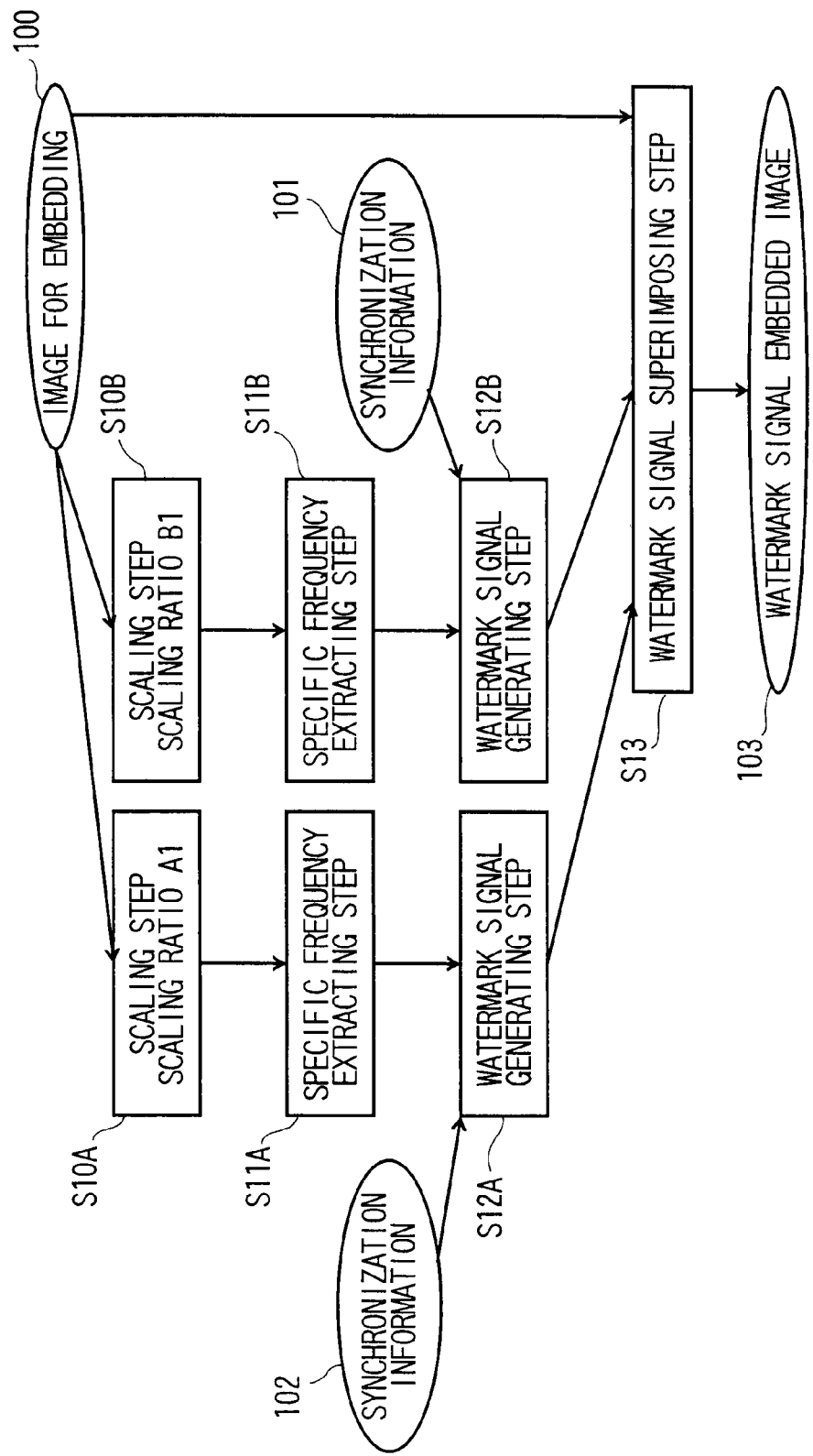
FIG. 4 is a flowchart showing a method of embedding a digital watermark according to the first embodiment.

Referring now to FIG. 2 and FIG. 4, the embedding apparatus according to a second embodiment will be described. In the second embodiment, the resistance against the geometry deformation and the resistance against the frame jitter are both established.

The technology of embedding the digital watermark image signal on the basis of the specific frequency component signal extracted from the input image signal when embedding, and detecting the same on the basis of the specific frequency component signal which is equivalent to the embedding side extracted from the input image signal at the time of detection is known to have a resistance against the geometry deformation.

On the other hand, when the performance is improved by adding or subtracting the digital watermark image signal by a different sign depending on the frame for embedding or detection for reducing the original image signal component using the difference in the direction of time, it is necessary to synchronize the embedding side and the detecting side for each frame (to detect with the same sign as the sign used for embedding) in order to detect the embedded digital watermark information correctly and, when the embedded pattern is changed by the frame jitter, synchronism is disabled, so that there arises a problem such that the embedded information cannot be detected.

As a synchronizing method by detecting the sign from the embedded digital watermark information, it is considered to embed a sign bit including the sign information for embedding as the digital watermark and detect the sign bit on the detecting side, so that the embedded sign information at the time of embedding can be obtained on the detecting side, whereby the synchronism between the embedding side and the detecting side is achieved.

Therefore, in the second embodiment, a configuration to achieve the synchronism between the embedding side and the detecting side by embedding the synchronism information (the sign information at the time of embedding) together with the watermark information as the digital watermark is employed.

FIG. 2 is a block diagram showing a basic configuration of the embedding apparatus in the second embodiment.

The embedding apparatus includes the scaling unit 10, the extractor 11, the generator 12, and the superimposer 13.

An operation of the embedding apparatus will be described.

A digitalized image signal of a moving image or a still image is input to the embedding apparatus as an image in which watermark information is to be embedded (image for embedding 100). The image for embedding 100 may include both a luminous signal and a color difference signal, but may include only the luminous signal.

The image for embedding 100 input into the embedding apparatus is input to the scaling unit 10B provided in a line for embedding the to-be-embedded information (digital watermark), the scaling unit 10A provided in a line for embedding synchronization information for synchronizing the embedding side and the detecting side on the frame-to-frame basis (synchronization information), and the superimposer 13. In other words, there are two kinds of to-be-embedded information, that is, the watermark information and the synchronization information. However, the watermark information will be explained as the to-be-embedded information, and the synchronization information will be explained as the synchronization information as is. The term "synchronization information" means also the synchronization information which indicates the polarity of the watermark information in the input image signal in each frame when adding the N kinds of watermark image signals to the input image signal.

First of all, embedding of the synchronization information will be described.

In the process of embedding of the synchronization information, the image for embedding 100 is contracted (or enlarged) by the scaling unit 10A at the scaling ratio A1. This signal is input to the extractor 11A.

Then, the extractor 11A extracts a specific frequency component which is equivalent to that at the time of detection. The extractor 11A includes, for example, a low-pass filter or a high-pass filter having a predetermined cut-off frequency, or a band-pass filter having a predetermined pass-band center frequency, and extracts a specific frequency component equivalent to the detecting side from the signal contracted (or enlarged) by the scaling unit 10A, for example, a relatively high frequency component. The filter used for embedding may be a filter completely the same filter as that used for detection.

Then, the generator 12A generates a watermark image signal on the basis of the specific frequency component signal outputted from the extractor 11A and synchronization information 102. The synchronization information 102 is a signal train of digital signals "1" or "0".

The embedding of the to-be-embedded information will be described.

In the process of embedding of the to-be-embedded information, the image for embedding 100 is contracted (or enlarged) by the scaling unit 10B at the scaling ratio B1. This signal is input to the extractor 11B. The scaling ratios A1 and B1 are different values.

Then, the extractor 11B extracts the specific frequency component equivalent to that at the time of detection. The filter used for embedding may be a filter completely the same filter as that used for detection. Then, a watermark image signal is generated by the generator 12B on the basis of the specific frequency component signal outputted from the extractor 11B and a to-be-embedded information 101. The to-be-embedded information 101 is a signal train of digital signals "1" or "0".

Finally, the superimposer 13 receives a supply of the watermark image signal generated by the generators 12A and 12B. The superimposer 13 includes a digital adder, and the watermark image signal is superimposed with the image for embedding 100 so that the watermark signal embedded image 103 is generated.

The specific frequency component signals extracted by the extractors 11A and 11B may be present by a plurality of channels, and in this case, the watermark image signals of the plurality of channels are superimposed with the image for embedding 100 by the watermark signal superimposer 13, so that the watermark signal embedded image 103 is generated.

Referring now to a flowchart in FIG. 4, the procedure of a method of embedding a digital watermark according to the second embodiment will be described.

Here, a method of embedding a digital watermark in a case in which M kinds (1<=M<N) from among the N (N>1) kinds of to-be-embedded information are watermark information, and the remaining (N-M) kinds of the to-be-embedded information are synchronization information, in which N=2 and M=1, that is, one of the two kinds of to-be-embedded information is the synchronization information and the remaining kind is the watermark information, is explained. The same consideration is also applicable to a case in which the values of N and M are different.

The image for embedding 100 input when embedding the digital watermark is input to the scaling step S10A in the embedding of the to-be-embedded information for embedding the to-be-embedded information (watermark information), the scaling step S10B for embedding the information for synchronizing the embedding side and the detecting side on the frame-to-frame basis, and the watermark signal superimposing step S13.

In the process of embedding the synchronization information, the signal contracted (or enlarged) by the scaling ratio A1 in the scaling step S10A is input to the specific frequency extracting step S11A. The specific frequency extracting step S11A extracts the specific frequency component equivalent to that at the time of detection. The specific frequency extracting step S11A includes, for example, a low-pass filter or a high-pass filter having a predetermined cut-off frequency, or a band-pass filter having a predetermined pass-band center frequency, and extracts a specific frequency component equivalent to the detecting side from the contracted (or enlarged) signal, for example, a relatively high frequency component in the scaling step S10A. Here, the filter used for embedding may be a filter completely the same filter as that used for detection. Then, a watermark image signal is generated in the watermark signal generating step S12A on the basis of the specific frequency component signal outputted in the specific frequency extracting step S11A and the synchronization information 102. The synchronization information 102 is a signal train of digital signals "1" or "0".

In the same manner, in the process of embedding the to-be-embedded information, the signal contracted (or enlarged) in the scaling step S10B at the scaling ratio B1 is input to the specific frequency extracting step S11B. The specific frequency extracting step S11B extracts a specific frequency component equivalent to that at the time of detection. Here, the filter used for embedding may be a filter completely the same filter as that used for detection. Then, a watermark image signal is generated in the watermark signal generating step S12B on the basis of the specific frequency component signal outputted in the specific frequency extracting step S11B and the to-be-embedded information 101. The to-be-embedded information 101 is a signal train of digital signals "1" or "0".

The watermark image signals generated in the watermark signal generating steps S12A and 12B are supplied to the watermark signal superimposing step S13 including the digital adder, and is superimposed with the image for embedding 100, so that the watermark signal embedded image 103 is generated.

In the second embodiment, synchronism between the embedding side and the detecting side is achieved by embedding the synchronization information as the digital watermark.

Since the scaling ratios A1 and B1 are different values, embedding of the both information at a specific position in a superimposed manner is enabled. Since the positions having the resistance against the geometry deformation are limited, by embedding a large amount of information which is required in the to-be-embedded information and the synchronization information into a specific position having the resistance against the geometry deformation in a superimposed manner according to this method, resistance against the geometry deformation is achieved.

Third Embodiment

Figure 3:
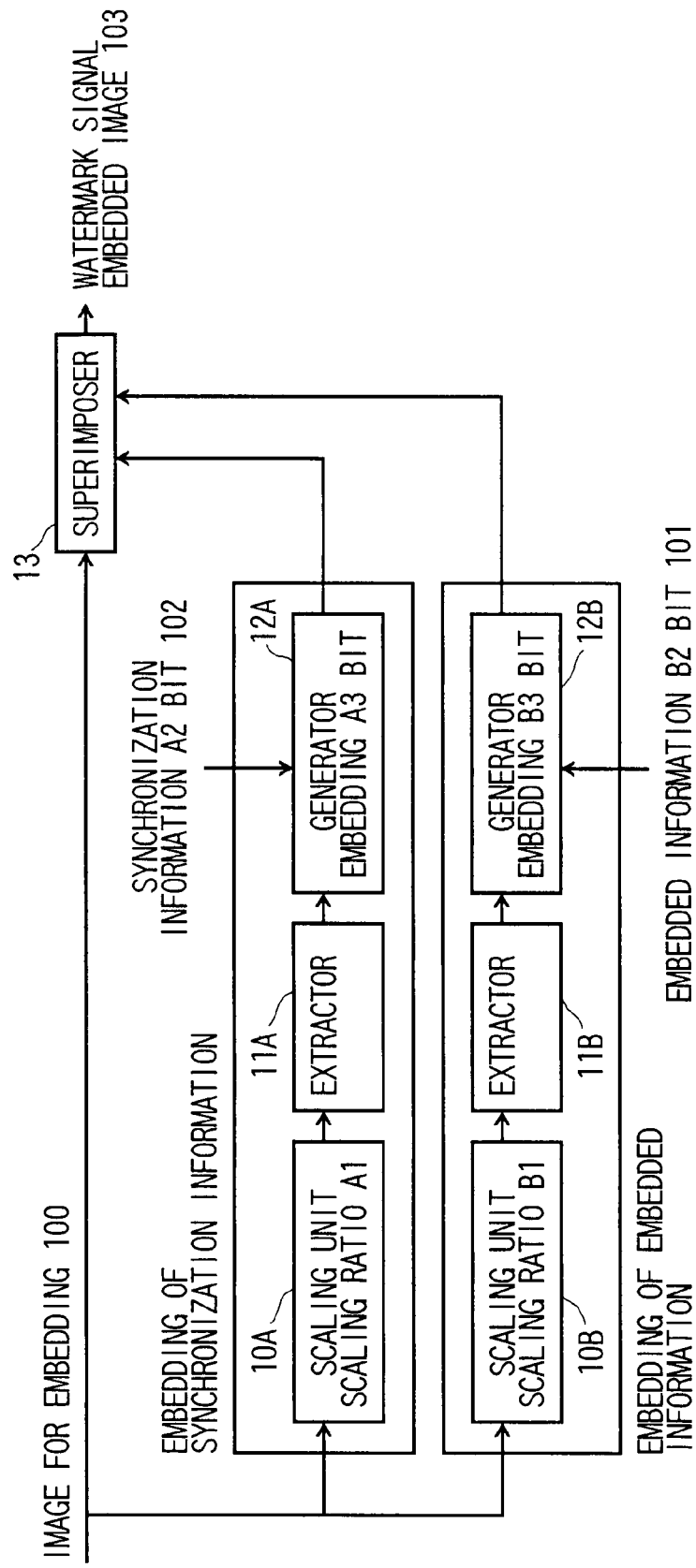
FIG. 3 is a block diagram showing a configuration of the embedding apparatus according to a third embodiment.

Referring now to FIG. 3, the embedding apparatus according to a third embodiment will be described.

In the third embodiment, the resistance against the geometry deformation and the resistance against the frame jitter are both established.

The technology of embedding the digital watermark image signal on the basis of the specific frequency component signal extracted from the input image signal when embedding, and detecting the same on the basis of the specific frequency component signal which is equivalent to the embedding side extracted from the input image signal at the time of detection has a resistance against the geometry deformation.

However, since the image signal component and the digital watermark image signal component are separated by the cumulative addition which inverts the sign at a predetermined pattern in the direction of time, there arises a problem such that the embedded information cannot be detected when the embedded pattern is changed due to the frame jitter.

Therefore, in the third embodiment, synchronism between the embedding side and the detecting side is achieved by embedding the synchronization information as the digital watermark.

While the embedded information can be detected by cumulation for a long time, the synchronization information requires detection for a short time (one frame, for example). Therefore, a high detection performance is required, and hence a redundant embedding provided with an error correcting capability (multi-bit embedding) is required.

FIG. 3 is a block diagram showing a basic configuration of the embedding apparatus.

The embedding apparatus includes the scaling unit 10, the extractor 11, the generator 12, and the superimposer 13.

An operation of the embedding apparatus will be described.

The embedding apparatus receives an input of digitalized image signal of a moving image or a still image as an image for embedding the watermark information (image for embedding 100). The image for embedding 100 may include both the luminance signal and the color difference signal, and may include only the luminous signal.

The image for embedding 100 input to the embedding apparatus is input to the scaling unit 10A provided in a line for embedding the to-be-embedded information (watermark information), the scaling unit 10B provided in a line for embedding the synchronization information for synchronizing the embedding side and the detecting side (synchronization information) on the frame-to-frame basis, and the superimposer 13.

The process of embedding the synchronization information will be described.

In the process of embedding the synchronization information, the image for embedding 100 is contracted (or enlarged) by the scaling unit 10A at a scaling ratio A1. This signal is input to the extractor 11A.

Then, the extractor 11A extracts the specific frequency component equivalent to that at the time of detection. The extractor 11A includes, for example, a low-pass filter or a high-pass filter having a predetermined cut-off frequency, or a band-pass filter having a predetermined pass-band center frequency, and extracts a specific frequency component equivalent to the detecting side from the signal contracted (or enlarged) by the scaling unit 10A, for example, a relatively high frequency component. The filter used for embedding may be a filter completely the same filter as that used for detection.

Subsequently, the generator 12A generates a watermark image signal on the basis of the specific frequency component signal outputted from the extractor 11A and the synchronization information (A2 bit) 102 (embedded bit A3). The synchronization information 102 is a signal train of digital signals "1" or "0".

The process of embedding the to-be-embedded information will be described.

In the process of embedding the synchronization information, the image for embedding 100 is contracted (or enlarged) by the scaling unit 10B at the scaling ratio B1. This signal is input to the extractor 11B. The scaling ratios A1 and B1 are different values.

Then, the extractor 11B extracts the specific frequency component equivalent to that at the time of detection. The filter used for embedding may be a filter completely the same filter as that used for detection.

The generator 12B then generates a watermark image signal on the basis of the specific frequency component signal outputted from the extractor 11B and the to-be-embedded information (B2 bit) 101 (embedding bit B3).

The to-be-embedded information 101 is a signal train of digital signals "1" or "0". The relation of the embedding bit numbers is A3/A2>B3/B2.

Finally, the superimposer 13 receives a supply of the watermark image signal generated by the generators 12A and 12B. The superimposer 13 includes a digital adder, and generates the watermark signal embedded image 103 by superimposing the watermark image signal with the image for embedding 100.

Since the scaling ratios A1 and B1 are different values, embedding of both information at a specific position in a superimposed manner is enabled. Since the positions having the resistance against the geometry deformation for embedding are limited, by embedding a larger amount of information which is required in the to-be-embedded information and the synchronization information into a specific position having the resistance against the geometry deformation in a superimposed manner according to this method, resistance against the geometry deformation is achieved.

By setting the relation of the embedding bit numbers to A3/A2>B3/B2, a redundant embedding providing an error correcting capability or an error detecting capability more to the synchronizing information than to the to-be-embedded information is performed.

(Modification)

The invention is not limited to the embodiments shown above, and may be modified in various manner without departing from the scope of the invention.

(1) Modification 1

In the embodiments shown above, the method of embedding the digital watermark has been described relating a case of embedding the synchronization information. However, the same consideration is also applicable to the embedding of the plurality of to-be-embedded information irrespective of the synchronization information.

It is also considerable to perform a redundant embedding providing an error correcting capability or an error detecting capability more to the synchronizing information than to the to-be-embedded information.

(2) Modification 2

In an example of embedding in the embodiments shown above, the example of embedding the both information in a superimposed manner by differentiating the scaling ratios has been described. However, it is also applicable to embed the both information in a superimposed manner by changing other embedding parameters (for example, a specific frequency) other than the scaling ratios.

It is also applicable to set one of the scaling ratios in the scaling of the to-be-embedded information or the scaling of the synchronization information to an equal magnification.

(3) Modification 3

The invention is not limited to the embodiments shown above, and it is also applicable to set synchronization pattern of the embedding synchronization information freely.

For example, it is applicable to set the synchronization pattern at random to make hacking difficult. It is also applicable to alleviate deterioration of the image quality due to embedding by embedding the synchronization pattern after having adjusted by the image characteristics.

Embodiments of Detecting Apparatus

The image signal (watermark signal embedded image 103) having the watermark information embedded by the embedding apparatus in the respective embodiments shown above is transmitted by being recorded on the recording medium by a digital image recording and reproducing apparatus such as a DVD system, being shown in a theater as a movie material, or via a transmission media such as the internet, the broadcast satellite, or the communication satellite.

Referring now to the drawings, embodiments of the detecting apparatus when detecting the watermark signal embedded image 103 will be described.

First Embodiment

Figure 5:
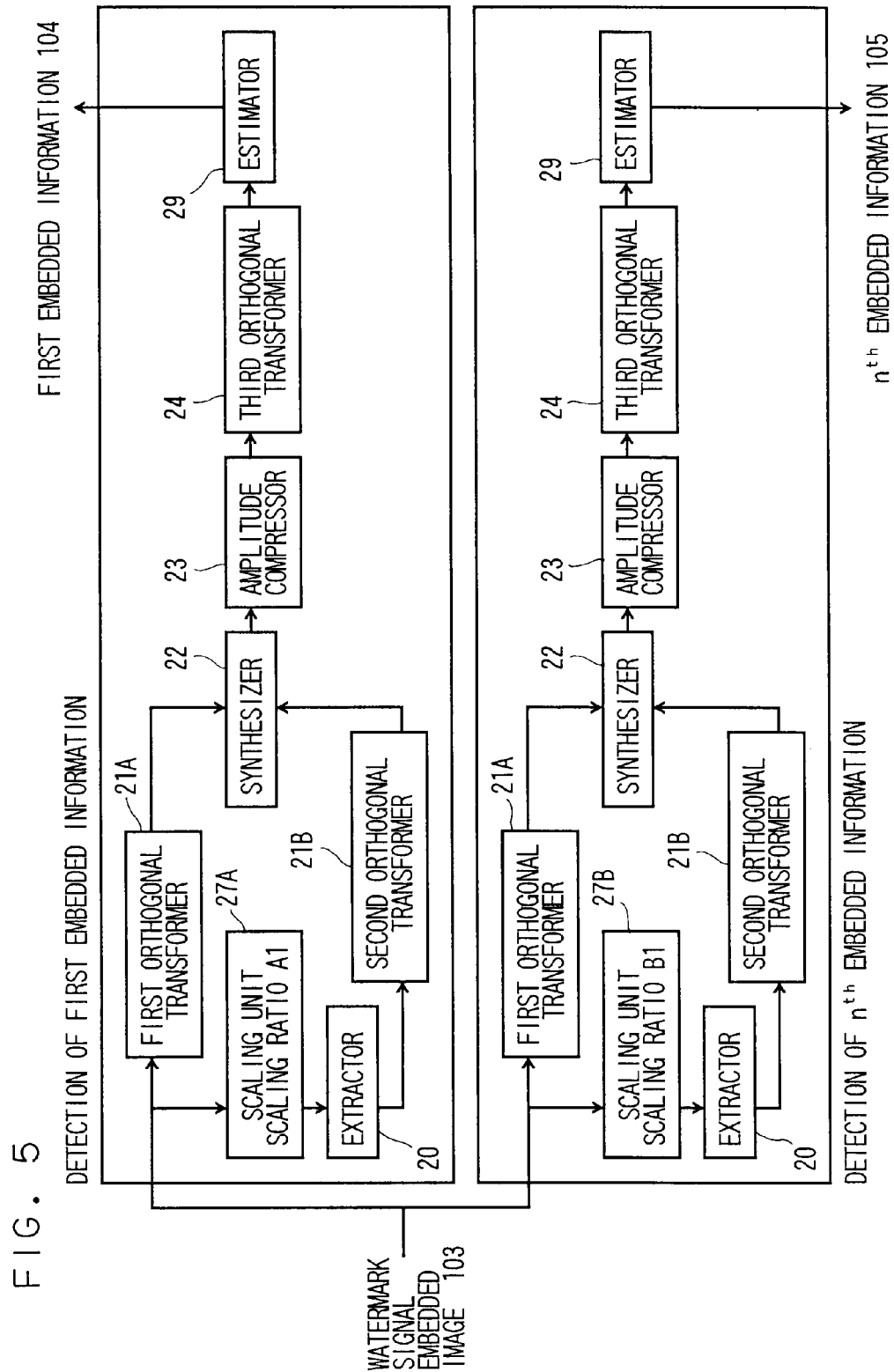
FIG. 5 is a block diagram showing a configuration of a detecting apparatus according to the first embodiment.
Figure 14:
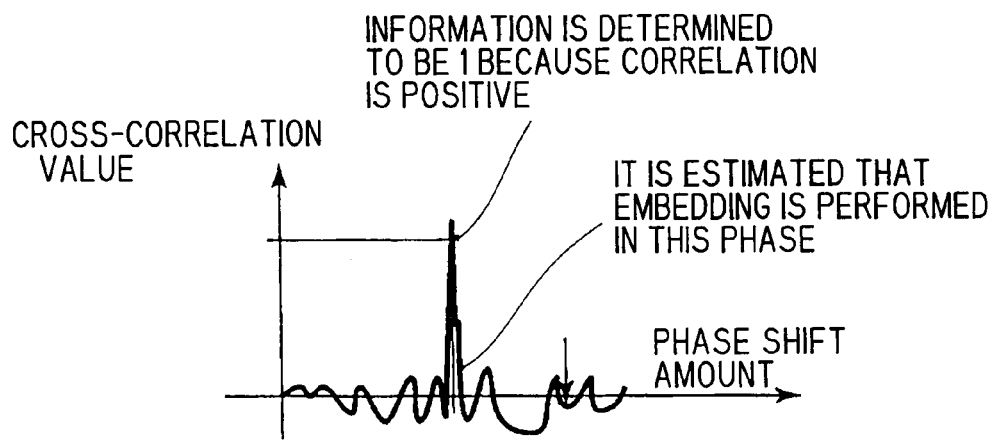
FIG. 14 is a drawing showing an example of operations of correlation value peak search and watermark information detection in the digital detecting apparatus according to the first embodiment.
Figure 15:
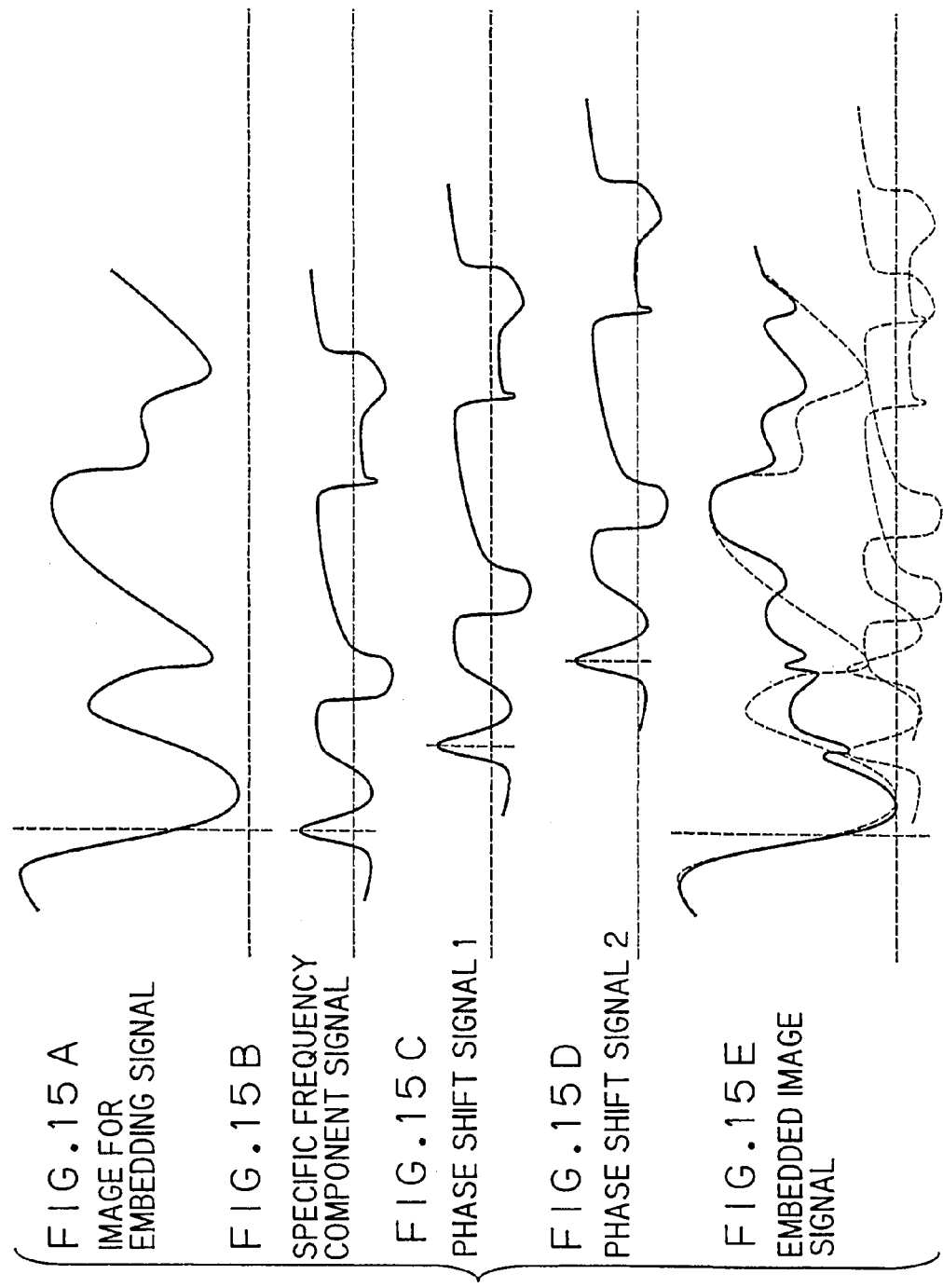
FIGS. 15A to 15E are waveform charts of respective signals showing an operation of the digital watermark embedding apparatus in FIG. 1.
Figure 16:
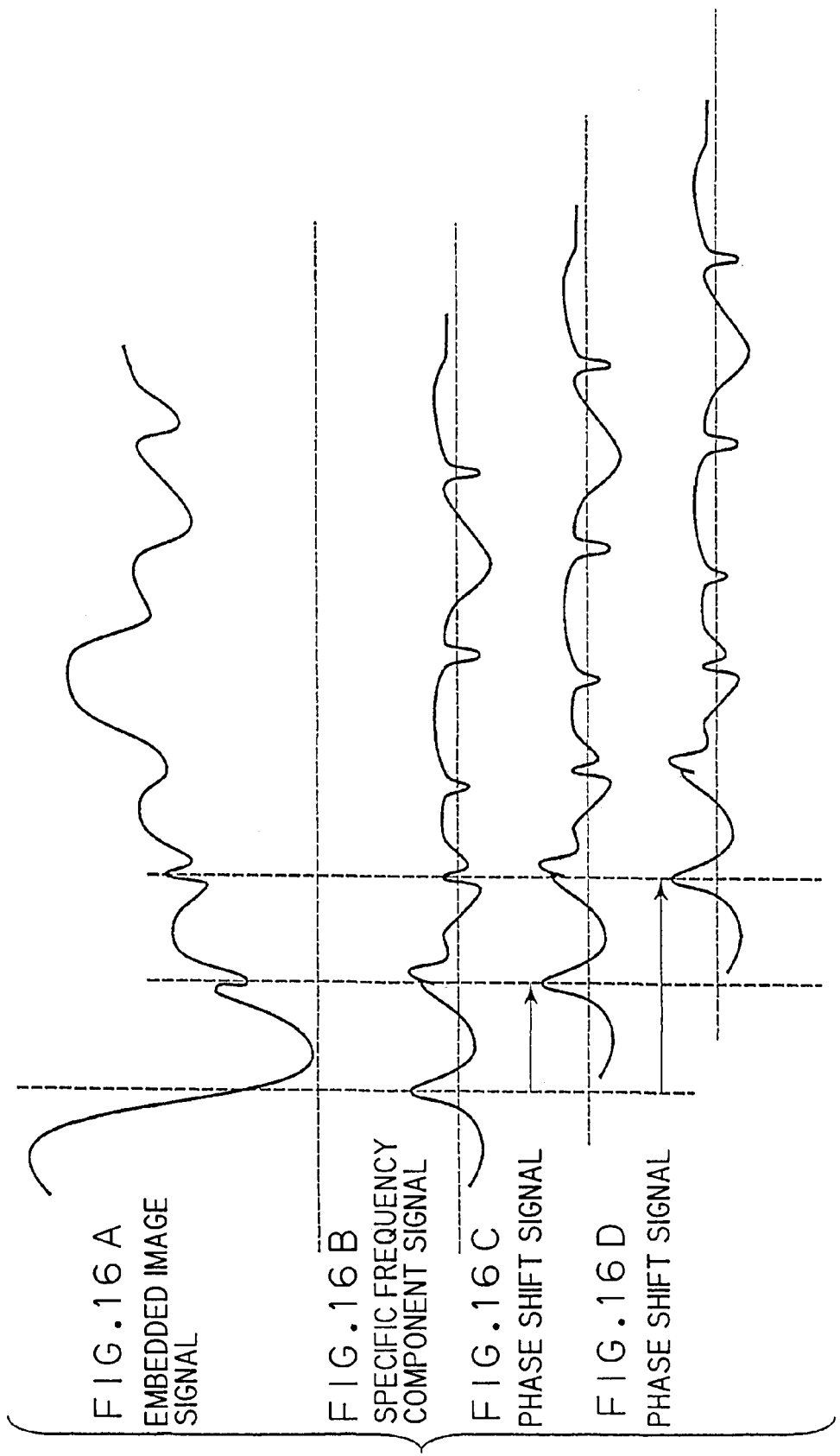
FIGS. 16A to 16D are waveform charts of respective signals showing an operation of the detecting apparatus in FIG. 5.

Referring now to FIG. 5, FIG. 13, and FIG. 14, the detecting apparatus according to the first embodiment will be described.

FIG. 5 shows a configuration of the detecting apparatus according to the first embodiment.

The detecting apparatus includes a scaling unit 27A, an extractor 20, a first orthogonal transformer 21A, a second orthogonal transformer 21B, a synthesizer 22, an amplitude compressor 23, a third orthogonal transformer 24, and an estimator 29.

The detecting device receives an input of the watermark signal embedded image (hereinafter, referred to simply as embedded image) 103 having a plurality of kinds of embedded information (first embedded information 104, $n^{th}$ embedded information 105) embedded therein by the embedding apparatus in the first embodiment via the recording medium or the transmission medium. It is assumed that a signal train of digital signals "1" or "0" is embedded as the embedded information. The sign "n" of the $n^{th}$ embedded information is 2 or larger.

A method of estimation of a first embedded information will be described.

The embedded image 103 is scaled by the scaling unit 27A at the scaling ratio A1. The scaling unit 27A performs the scaling at the same scaling ratio as that of the scaling unit 10A used in the embedding apparatus.

Then, only a specific component is extracted from the scaled signal by the extractor 20. The extractor 20 is a digital filter having the same frequency area as that of the extractor 11A used in the embedding apparatus, for example, a low-pass filter or a high-pass filter having a predetermined cut-off frequency, or a band-pass filter having a predetermined passband center frequency.

Then, the signal extracted by the extractor 20 is subjected to an orthogonal transform such as Fourier transform by the second orthogonal transformer 21B, and the embedded image 103 is subjected to the orthogonal transform such as Fourier transform by the first orthogonal transformer 21A. The extractor 20 may extract all the frequency components.

Then, the component after the first orthogonal transformer 21A (for example, Fourier transform) and the component after the second orthogonal transformer 21B (for example, Fourier transform) are synthesized to a complex component by the synthesizer 22.

Then, the amplitude component of the synthesized signal is compressed by the amplitude compressor 23. The orthogonal transform such as inverse Fourier transform (inverse orthogonal transform) is performed on the compressed signal by the third orthogonal transformer 24. The third orthogonal transform is required to be paired with the transform in the first orthogonal transform and the second orthogonal transform, and when Fourier transform is used in the first orthogonal transform and the second orthogonal transform, Fourier transform or the inverse Fourier transform is performed as the third orthogonal transform.

Then, the signal after the third orthogonal transform is given to an input of the estimator 25, and the first embedded information 104 is estimated by the estimator 29. A correlation method by the orthogonal transform, the complex synthesis, and the amplitude compression of this type is referred to as a phase-only correlation (POC).

A method of estimation of the embedded information with respect to the plurality of kinds of embedded information will be described taking the estimation of the $n^{th}$ embedded information as an example.

The embedded image 103 is scaled by the scaling unit 27B at the scaling ratio B1. The scaling unit 27B performs the scaling at the same scaling ratio as that of the scaling unit 10B used in the embedding apparatus.

Then, only a specific component is extracted from the scaled signal by the extractor 20. The extractor 20 is a digital filter having the same frequency area as that of the extractor 11B used in the embedding apparatus, for example, a low-pass filter or a high-pass filter having a predetermined cut-off frequency, or a band-pass filter having a predetermined passband center frequency.

Then, the signal extracted by the extractor 20 is subjected to the orthogonal transform such as Fourier transform by the second orthogonal transformer 21B, and the embedded image 103 is subjected to the orthogonal transform such as Fourier transform by the first orthogonal transformer 21A. The extractor 20 may extract all the frequency components.

Then, the component after the first orthogonal transformer 21A (for example, Fourier transform) and the component after the second orthogonal transformer 21B (for example, Fourier transform) are synthesized to a complex component by the synthesizer 22.

Then, the amplitude component of the synthesized signal is compressed by the amplitude compressor 23. The orthogonal transform such as inverse Fourier transform (inverse orthogonal transform) is performed on the compressed signal by the third orthogonal transformer 24. The third orthogonal transform is required to be paired with the transform in the first orthogonal transform and the second orthogonal transform, and when Fourier transform is used in the first orthogonal transform and the second orthogonal transform, Fourier transform or the inverse Fourier transform is performed as the third orthogonal transform.

Then, the signal after the third orthogonal transform is given to an input of the estimator 29, and the $n^{th}$ embedded information 105 is estimated by the estimator 25 on the basis of the correlation signal after the third orthogonal transform. A correlation method by the orthogonal transform, the complex synthesis, and the amplitude compression of this type is referred to as a phase-only correlation. Other correlation methods such as cross correlation may be employed instead of the phase-only correlation for the correlation between the embedded image 103 and the specific frequency component signal.

The scaling ratios A1 and B1 are different values, and in this configuration, the plurality of kinds of information embedded in a specific position in a superimposed manner can be detected separately.

Referring now to FIG. 13 and FIG. 14, a method of estimating the first embedded information 104 by the estimator 29 will be described.

The estimator 29 receives inputs of embedded image 103 (image having a phase shift of the specific frequency component signal and the amplitude transform signal embedded therein) and the correlation of the specific frequency component signal extracted by the extractor 20 (the cross-correlation or the phase-only correlation). The relation between the correlation value and the amount of phase shift is shown in FIG. 13 and FIG. 14.

As shown in FIG. 13 and FIG. 14, as regards the change in correlation value, a peak appears at a position of a certain amount of phase shift, and the polarity of this peak indicates the embedded information 101. For example, the peak of the correlation value takes either the positive or negative value according to the value of the watermark information and, for example, the watermark information is determined to be "1" when the peak is a positive value and the watermark information is determined to be "0" when the peak is a negative value. In this manner, the first embedded information 104 determined by the estimator 29 is outputted.

The detecting apparatus here has a configuration suitable for a case in which the embedded image 103 is subjected to a scaling attack. When the embedded image 103 is subjected to the scaling attack, the amount of phase shift of the specific frequency component signal assumes a different value from the amount of phase shift given to the specific frequency component signal by the watermark embedding apparatus.

Therefore, in the first embodiment, the amount of phase shift is controlled by the estimator 29 continuously or step-by-step and the peak of the correlation value outputted correspondingly is searched, and then watermark information is estimated and detected from the position, polarity, and size of the searched peak. In this example, the correlation value is positive, and hence the watermark information is estimated to be "1". In this manner, the embedded information 101 detected by the estimator 29 is outputted also to the image having subjected to the scaling attack.

According to the first embodiment, the specific frequency component is extracted from the embedded image 103, and the watermark information is detected from the result of correlation between the specific frequency component and the embedded image 103 (the cross correlation or the shift-only correlation). In this case, the peak of the correlation value is searched by performing the correlation calculation while shifting the phase (changing the position), and hence the first embedded information 104 is detected easily also from the embedded image 103 having subjected to the scaling attack.

Second Embodiment

Figure 6:
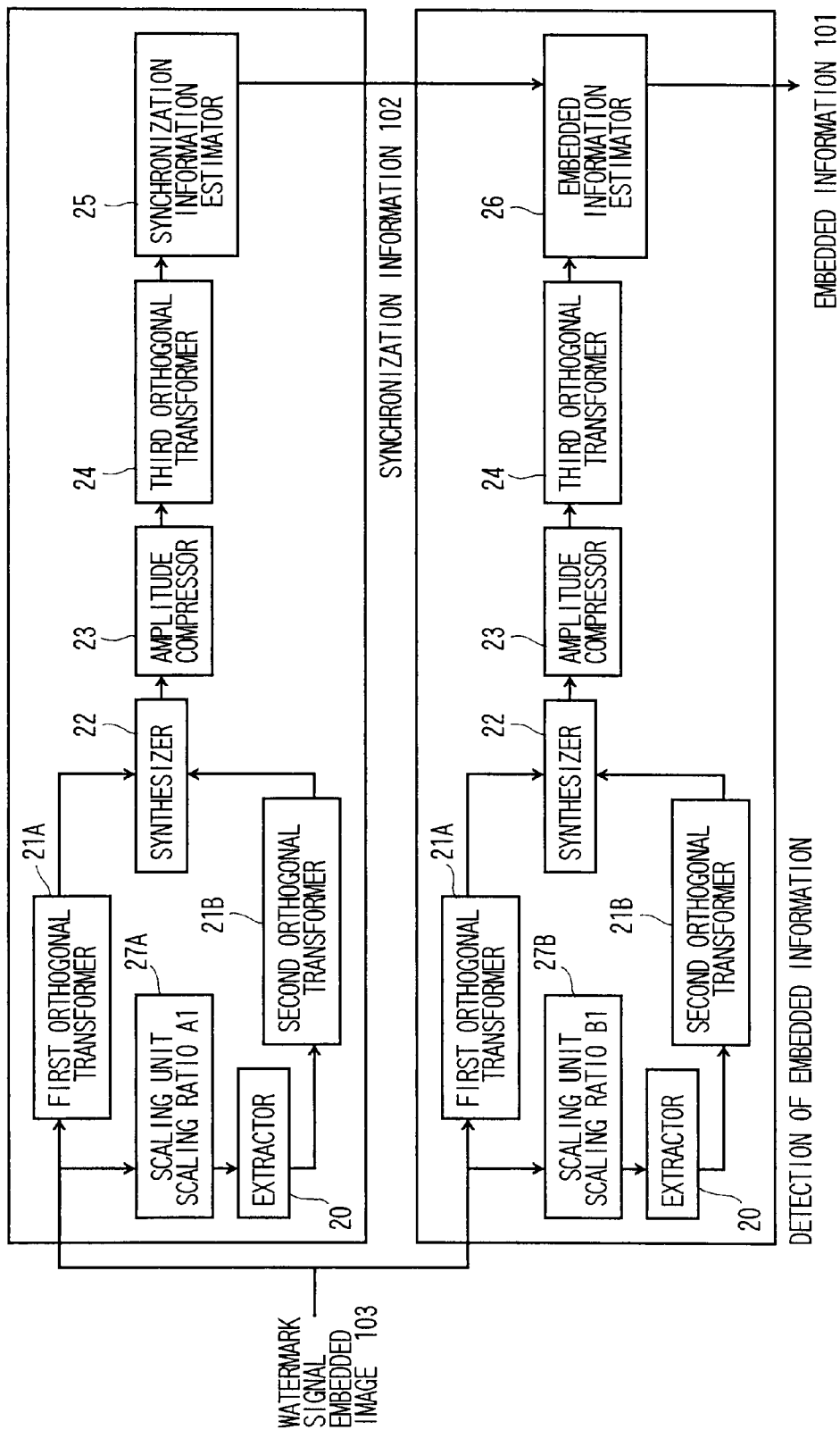
FIG. 6 is a block diagram showing a configuration of the detecting apparatus according to the second embodiment.

Referring now to FIG. 6, the detecting apparatus according to the second embodiment will be described.

FIG. 6 shows a configuration of the detecting apparatus according to the second embodiment.

The detecting apparatus includes the scaling unit 27, the extractor 20, the first orthogonal transformer 21A, the second orthogonal transformer 21B, the synthesizer 22, the amplitude compressor 23, the third orthogonal transformer 24, the synchronization information estimator 25, and the embedded information estimator 26.

The detecting apparatus receives an input of the embedded image 103 having the embedded information 101 and the synchronization information 102 embedded therein by the embedding apparatus described in the second embodiment via the recording medium and the transmission medium. The signal train of digital signals "1" or "0" is assumed to be embedded as the embedded information.

A method of estimation of the synchronization information will be described.

First of all, the embedded image 103 is scaled by the scaling unit 27A at the scaling ratio A1. The scaling unit 27A performs the scaling at the same scaling ratio as the scaling unit 10A used in the embedding apparatus.

Then, only a specific component is extracted from the scaled signal by the extractor 20. The extractor 20 is a digital filter having the same frequency area as that of the extractor 11A used in the embedding apparatus, for example, a low-pass filter or a high-pass filter having a predetermined cut-off frequency, or a band-pass filter having a predetermined pass-band center frequency.

Then, the signal extracted by the extractor 20 is subjected to the orthogonal transform such as Fourier transform by the second orthogonal transformer 21B, and the embedded image 103 is subjected to the orthogonal transform such as Fourier transform by the first orthogonal transformer 21A. The extractor 20 may extract all the frequency components.

Then, the component after the first orthogonal transformer 21A (for example, Fourier transform) and the component after the second orthogonal transformer 21B (for example, Fourier transform) are synthesized to a complex component by the synthesizer 22.

Then, the amplitude component of the synthesized signal is compressed by the amplitude compressor 23. The orthogonal transform such as inverse Fourier transform (inverse orthogonal transform) is performed on the compressed signal by the third orthogonal transformer 24. The third orthogonal transform is required to be paired with the transform in the first orthogonal transform and the second orthogonal transform, and when Fourier transform is used in the first orthogonal transform and the second orthogonal transform, Fourier transform or the inverse Fourier transform is performed as the third orthogonal transform.

Then, the signal after the third orthogonal transform is given to an input of the synchronization information estimator 25, and the synchronization information 102 is estimated by the synchronization information estimator 25. A correlation method by the orthogonal transform, the complex synthesis, and the amplitude compression of this type is referred to as a phase-only correlation.

A method of estimation of the embedded information will be described.

The embedded image 103 is scaled by the scaling unit 27B at the scaling ratio B1. The scaling unit 27B performs the scaling at the same scaling ratio as that of the scaling unit 10B used in the embedding apparatus.

Then, only a specific component is extracted from the scaled signal by the extractor 20. The extractor 20 is a digital filter having the same frequency area as that of the extractor 11B used in the embedding apparatus, for example, a low-pass filter or a high-pass filter having a predetermined cut-off frequency, or a band-pass filter having a predetermined pass-band center frequency.

Then, the signal extracted by the extractor 20 is subjected to the orthogonal transform such as Fourier transform by the second orthogonal transformer 21B, and the embedded image 103 is subjected to the orthogonal transform such as Fourier transform by the first orthogonal transformer 21A. The extractor 20 may extract all the frequency components.

Then, the component after the first orthogonal transformer 21A (for example, Fourier transform) and the component after the second orthogonal transformer 21B (for example, Fourier transform) are synthesized to a complex component by the synthesizer 22.

Then, the amplitude component of the synthesized signal is compressed by the amplitude compressor 23. The orthogonal transform such as inverse Fourier transform (inverse orthogonal transform) is performed on the compressed signal by the third orthogonal transformer 24. The orthogonal transform is required to be paired with the transform in the first orthogonal transform, and when Fourier transform is used in the first orthogonal transform and the second orthogonal transform, Fourier transform or the inverse Fourier transform is performed as the third orthogonal transform.

Then, the signal after the third orthogonal transform is given to an input of the synchronization information estimator 25 and estimates the embedded information 101 by the embedded information estimator 26 on the basis of the estimated synchronization information 102 and the correlation signal after the third orthogonal transform. A correlation method by the orthogonal transform, the complex synthesis, and the amplitude compression of this type is referred to as a phase-only correlation. Other correlation methods such as cross correlation may be employed instead of the phase-only correlation for the correlation between the embedded image 103 and the specific frequency component signal.

The scaling ratios A1 and B1 are different values, and in this configuration, the two kinds of information embedded in a specific position in a superimposed manner can be detected separately.

Figure 8:
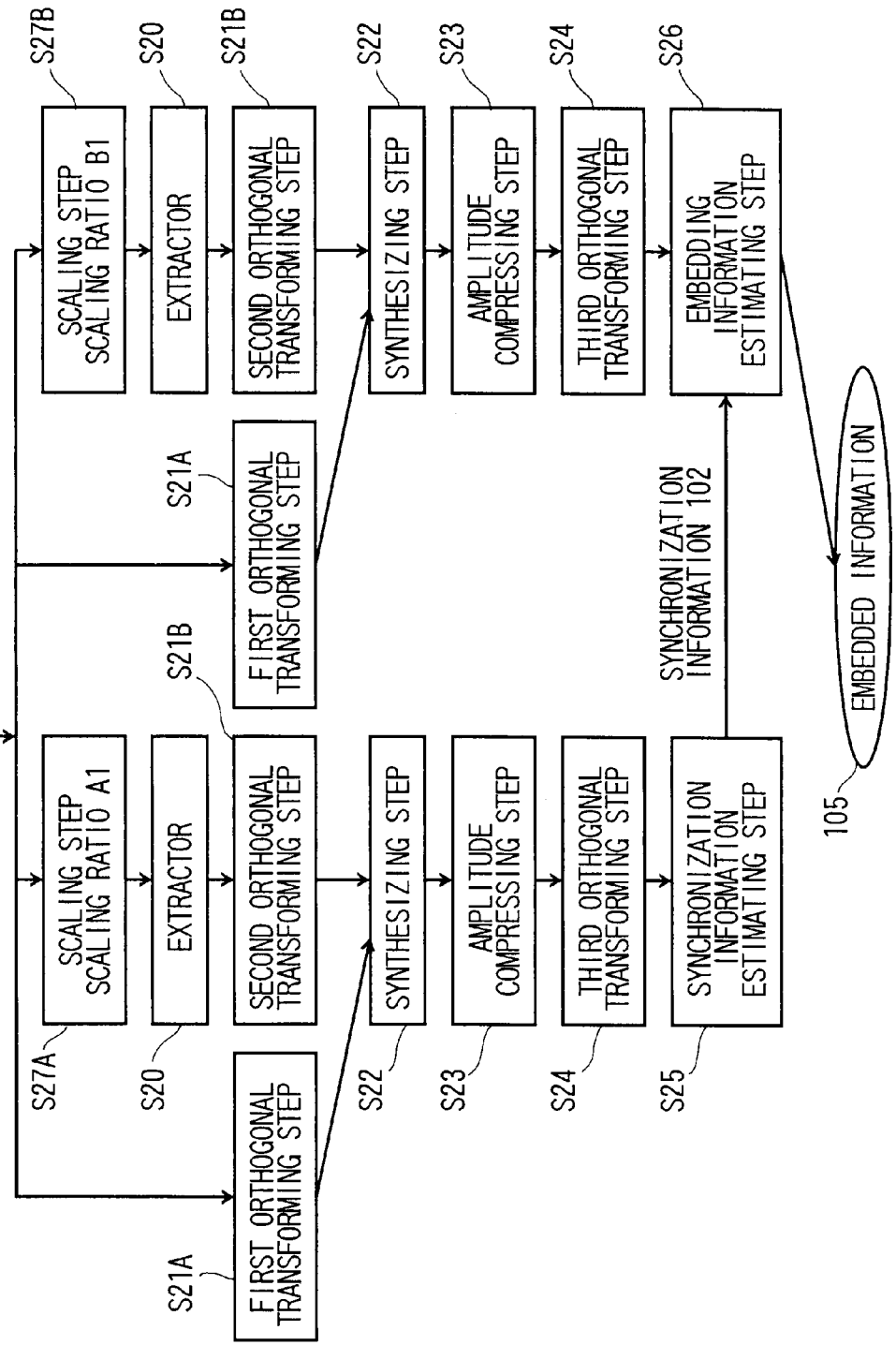
FIG. 8 is a flowchart showing a method of detecting a digital watermark according to the first embodiment.

Referring now to a flowchart in FIG. 8, the procedure of a method of detecting the digital watermark according to the second embodiment will be described.

Here, a method of detecting a digital watermark in a case in which M kinds (1<=M<N) from among the N (N>1) kinds of embedded information are watermark information, and the remaining (N-M) kinds of the embedded information are synchronization information, in which N=2 and M=1, that is, one of the two kinds of embedded information is the synchronization information is explained. The same consideration is also applicable to a case in which the values of N and M are different.

A method of estimation of the synchronization information will be described.

First of all, the embedded image 103 is scaled in the scaling step S27A at the scaling ratio A1. The scaling step S27A performs the scaling at the same scaling ratio as the scaling step S10A used in the embedding apparatus.

Then, only a specific component is extracted from the scaled signal in extracting step S20. The extracting step S20 is a digital filter having the same frequency area as that in the specific frequency extracting step S11A used in the embedding apparatus, for example, a low-pass filter or a high-pass filter having a predetermined cut-off frequency, or a band-pass filter having a predetermined pass-band center frequency.

Then, the signal extracted in the extracting step S20 is subjected to the orthogonal transform such as Fourier transform by the second orthogonal transforming step S21B, and the embedded image 103 is subjected to the orthogonal transform such as Fourier transform in the first orthogonal transforming step S21A. The extracting step S20 may extract all the frequency components.

Then, the component after the first orthogonal transforming step S21A (for example, Fourier transform) and the component after the second orthogonal transforming step S21B (for example, Fourier transform) are synthesized to a complex component in the synthesizing step S22.

Then, the amplitude component of the synthesized signal is compressed in the amplitude compressing step S23. The orthogonal transform such as inverse Fourier transform (inverse orthogonal transform) is performed on the compressed signal in the third orthogonal transforming step S24. The third orthogonal transform is required to be paired with the transform in the first orthogonal transform and the second orthogonal transform, and when Fourier transform is used in the first orthogonal transform and the second orthogonal transform, Fourier transform or the inverse Fourier transform is performed as the third orthogonal transform.

Then, the signal after the third orthogonal transform is given to an input in the synchronization information estimating step S25, and the synchronization information 102 is estimated in the synchronization information estimating step S25. A correlation method by the orthogonal transform, the complex synthesis, and the amplitude compression of this type is referred to as a phase-only correlation.

A method of estimation of the embedded information will be described.

The embedded image 103 is scaled in the scaling step S27B at the scaling ratio B1. The scaling step S27B performs the scaling at the same scaling ratio as that in the scaling step S10B used in the embedding apparatus.

Then, only a specific component is extracted from the scaled signal in the extracting step S20. The extracting step S20 is a digital filter having the same frequency area as that in the specific frequency extracting step S11B used in the embedding apparatus, for example, a low-pass filter or a high-pass filter having a predetermined cut-off frequency, or a band-pass filter having a predetermined pass-band center frequency.

Then, the signal extracted in the extracting step S20 is subjected to the orthogonal transform such as Fourier transform in the second orthogonal transforming step S21B, and the embedded image 103 is subjected to the orthogonal transform such as Fourier transform in the first orthogonal transforming step S21A. The extracting step S20 may extract all the frequency components.

Then, the component after the first orthogonal transforming step S21A (for example, Fourier transform) and the component after the second orthogonal transforming step S21B (for example, Fourier transform) are synthesized to a complex component in the synthesizing step S22.

Then, the amplitude component of the synthesized signal is compressed in the amplitude compressing step S23. The orthogonal transform such as inverse Fourier transform (inverse orthogonal transform) is performed on the compressed signal in the third orthogonal transforming step S24. The third orthogonal transform is required to be paired with the transform in the first orthogonal transform and the second orthogonal transform, and when Fourier transform is used in the first orthogonal transform and the second orthogonal transform, Fourier transform or the inverse Fourier transform is performed as the third orthogonal transform.

Then, the signal after the third orthogonal transform is given to an input of the synchronization information estimating step S25 and estimates the embedded information 101 in the embedded information estimating step S26 on the basis of the estimated synchronization information 102 and the correlation signal after the third orthogonal transform. A correlation method by the orthogonal transform, the complex synthesis, and the amplitude compression of this type is referred to as a phase-only correlation. Other correlation methods such as cross correlation may be employed instead of the phase-only correlation for the correlation between the embedded image 103 and the specific frequency component signal.

The scaling ratios A1 and B1 are different values, and in this configuration, the two kinds of information embedded in a specific position in a superimposed manner can be detected separately.

Here, it is also applicable to estimate the synchronization pattern on the basis of the detected synchronization information and, from then on, to detect while taking the estimated synchronization pattern into consideration. When the synchronization pattern is known on the detection side in advance, detection of synchronization information using the plurality of frames in the past on the basis of the estimated synchronization pattern is also considered.

Third Embodiment

Referring now to FIG. 7, and FIG. 19 to FIG. 21, the detecting apparatus according to the third embodiment will be described.

Figure 7:
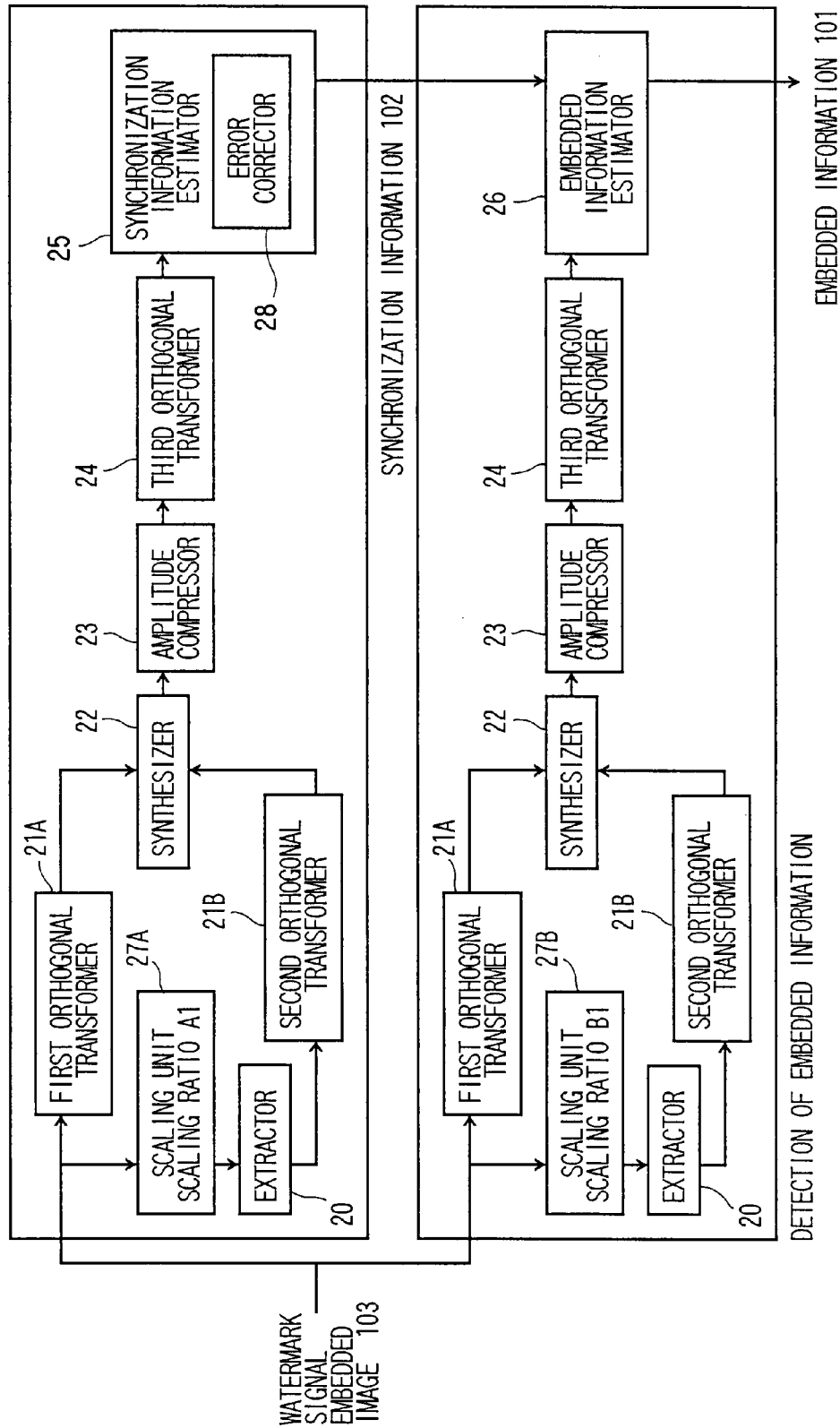
FIG. 7 is a block diagram showing a configuration of the detecting apparatus according to the third embodiment.

FIG. 7 shows a configuration of the detecting apparatus according to the third embodiment.

The detecting apparatus includes the scaling unit 27, the extractor 20, the first orthogonal transformer 21A, the second orthogonal transformer 21B, the synthesizer 22, the amplitude compressor 23, the third orthogonal transformer 24, the synchronization information estimator 25, the error corrector 28, and the embedded information estimator 26.

The detecting apparatus receives an input of the embedded image 103 having the embedded information 101 and the synchronization information 102 embedded therein by the embedding apparatus descried above via the recording medium or the transmission medium. It is assumed that a signal train of digital signals "1" or "0" is embedded as the embedded information.

A method of estimation of the synchronization information will be described.

The embedded image 103 is scaled by the scaling unit 27A at the scaling ratio A1. The scaling unit 27A performs the scaling at the same scaling ratio as that of the scaling unit 10A used in the embedding apparatus.

Then, only a specific component is extracted from the scaled signal by the extractor 20. The extractor 20 is a digital filter having the same frequency area as that of the extractor 11A used in the embedding apparatus, for example, a low-pass filter or a high-pass filter having a predetermined cut-off frequency, or a band-pass filter having a predetermined pass-band center frequency.

Then, the signal extracted by the extractor 20 is subjected to the orthogonal transform such as Fourier transform by the second orthogonal transformer 21B, and the embedded image 103 is subjected to the orthogonal transform such as Fourier transform by the first orthogonal transformer 21A. The extractor 20 may extract all the frequency components.

Then, the component after the first orthogonal transformer 21A (for example, Fourier transform) and the component after the second orthogonal transformer 21B (for example, Fourier transform) are synthesized to a complex component by the synthesizer 22.

Then, the amplitude component of the synthesized signal is compressed by the amplitude compressor 23. The orthogonal transform such as inverse Fourier transform (inverse orthogonal transform) is performed on the compressed signal by the third orthogonal transformer 24. The third orthogonal transform is required to be paired with the transform in the first orthogonal transform and the second orthogonal transform, and when Fourier transform is used in the first orthogonal transform and the second orthogonal transform, Fourier transform or the inverse Fourier transform is performed as the third orthogonal transform.

Then, the signal after the third orthogonal transform is given to an input of the synchronization information estimator 25, and the synchronization information 102 is estimated by the synchronization information estimator 25 on the basis of the information in which errors are corrected by the error corrector 28. A correlation method by the orthogonal transform, the complex synthesis, and the amplitude compression of this type is referred to as a phase-only correlation. An example of error correction will be described separately later.

A method of estimation of the embedded information will be described.

The embedded image 103 is scaled by the scaling unit 27B at the scaling ratio B1. The scaling unit 27B performs the scaling at the same scaling ratio as that of the scaling unit 10B used in the embedding apparatus.

Then, only a specific component is extracted from the scaled signal by the extractor 20. The extractor 20 is a digital filter having the same frequency area as that of the extractor 11B used in the embedding apparatus, for example, a low-pass filter or a high-pass filter having a predetermined cut-off frequency, or a band-pass filter having a predetermined passband center frequency.

Then, the signal extracted by the extractor 20 is subjected to the orthogonal transform such as Fourier transform by the second orthogonal transformer 21B, and the embedded image 103 is subjected to the orthogonal transform such as Fourier transform by the first orthogonal transformer 21A. The extractor 20 may extract all the frequency components.

Then, the component after the first orthogonal transformer 21A (for example, Fourier transform) and the component after the second orthogonal transformer 21B (for example, Fourier transform) are synthesized to a complex component by the synthesizer 22.

Then, the amplitude component of the synthesized signal is compressed by the amplitude compressor 23. The orthogonal transform such as inverse Fourier transform (inverse orthogonal transform) is performed on the compressed signal by the third orthogonal transformer 24. The third orthogonal transform is required to be paired with the transform in the first orthogonal transform and the second orthogonal transform, and when Fourier transform is used in the first orthogonal transform and the second orthogonal transform, Fourier transform or the inverse Fourier transform is performed as the third orthogonal transform.

Then, the signal after the third orthogonal transform is given to an input of the synchronization information estimator 25 and estimates the embedded information 101 by the embedded information estimator 26 on the basis of the estimated synchronization information 102 and the correlation signal after the third orthogonal transform. A correlation method by the orthogonal transform, the complex synthesis, and the amplitude compression of this type is referred to as a phase-only correlation. Other correlation methods such as cross correlation may be employed instead of the phase-only correlation for the correlation between the embedded image 103 and the specific frequency component signal.

The scaling ratios A1 and B1 are different values, and in this configuration, the two kinds of information embedded in a specific position in a superimposed manner can be detected separately.

Subsequently, a first detailed example of the error correction will be described.

The embedding apparatus performs a redundant embedding of the synchronization information while providing an error correcting function for improving the detection performance, and the detecting apparatus estimates the embedded synchronization information correctly by the error correction.

Here, as the first detailed example of the error correction, a method of detecting the synchronization information using a majority logic for all the frames will be described.

Assuming that the probability of 1 bit of the synchronization information being detected correctly is P, the probability of the synchronization information in this case being detected correctly is also P.

A case in which a 3-bit majority logic is used is considered. Assuming that the probability of 1 bit each of the synchronization information being detected correctly is P, the probability of the synchronization information in this case being detected correctly is;

$$P^3+3P^2(1-P) \tag{1},$$

Where the probability P is assumed not to depend on the position.

In the same manner, the probability of the synchronization information being detected correctly in the case of 5 bits is;

$$P^5+5P^4(1-P)+10P^3(1-P)^2 \tag{2},$$

And the probability of the synchronization information being detected correctly in the case of 7 bits is;

$$P^7+7P^6(1-P)+21P^5(1-P)^2+35P^4(1-P) \tag{3},$$

Where the probability P is assumed not to depend on the position.

Figure 19:
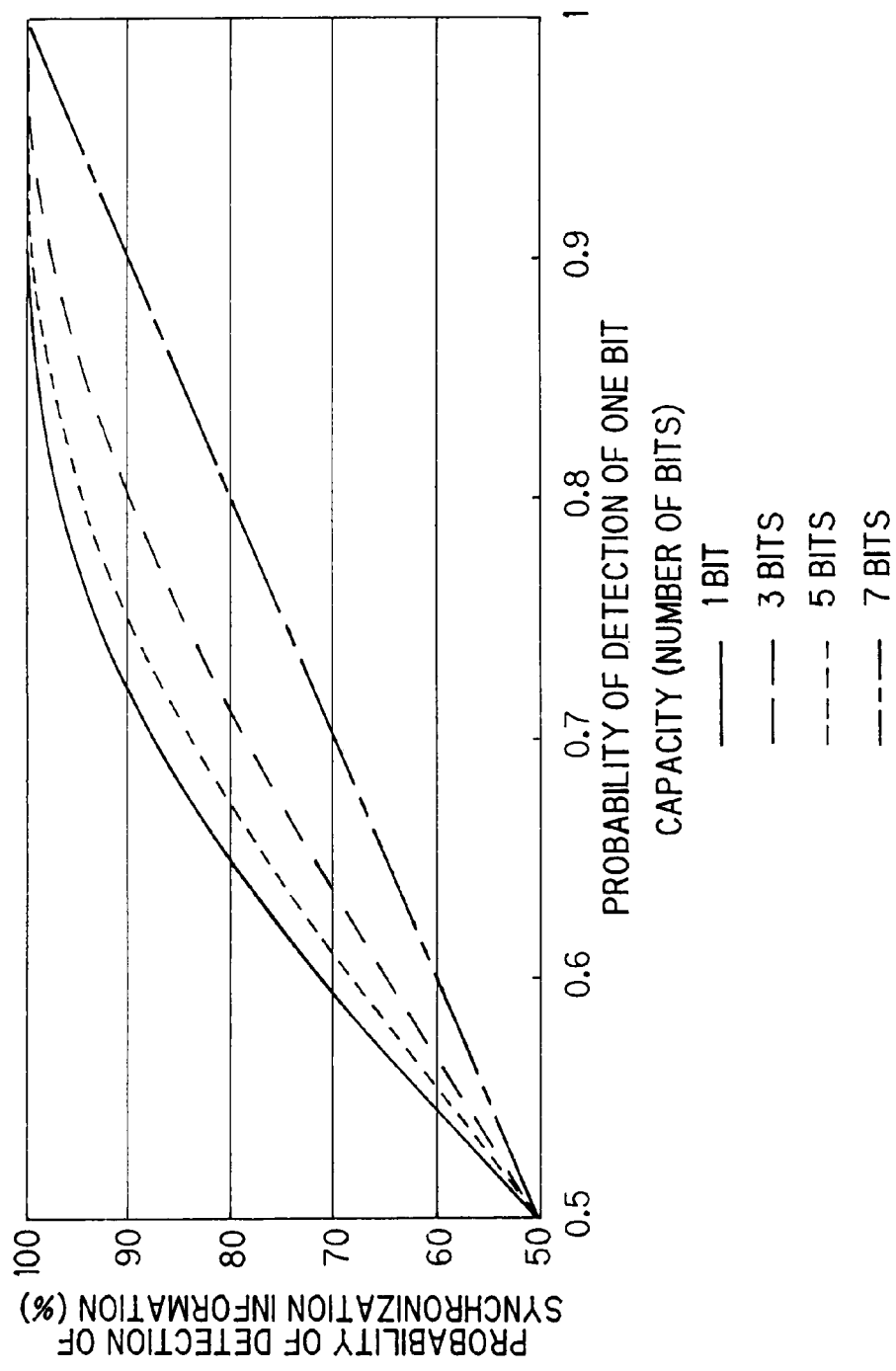
FIG. 19 is a drawing for explaining the change in detecting performance according to the capacity of the error correction according to the first embodiment.

FIG. 19 shows the relation of detection ratio. From FIG. 19, it is understood that the probability of the synchronization information being detected correctly increases with increase in capacity (number of bits) in the synchronization information.

Subsequently, a second detailed example of the error correction will be described.

The detecting apparatus estimates the embedded information on the basis of the synchronization information estimated on the frame-to-frame basis. However, the detection accuracy varies from frame to frame, and hence the utilization of the frame with low detection accuracy may affect adversely on the estimation of the embedded information.

Here, an example of extracting only the frames having a high accuracy will be described on the basis of the majority logic.

Assuming that the probability the 1 bit of the synchronization information being detected accurately is P, an example in which signs of 3 bits and 5 bits are used will be described.

First of all, the case in which the sign of 3 bits is used is considered. It is assumed that the same sign is embedded for all 3 bits at the time of embedding, and all the three bits are detected using only the frames having the same sign at the time of detection. The probability of the synchronization information in this case being detected correctly is;

$$\frac{P^3}{P^3 + (1-P)^3}. \quad (4)$$

The ratio of the frame to be extracted is;

$$P^3+(1-P)^3 \quad (5),$$

Where the probability P is assumed not to depend on the position.

In the same manner, in the case of the 5 bits, when all the 5 bits are detected using only the frames having the same sign at the time of detection, the probability of the synchronization information being detected correctly is;

$$\frac{P^5}{P^5 + (1-P)^5}, \quad (6)$$

And the ratio of the frames to be extracted is;

$$P^5+(1-P)^5 \quad (7).$$

In the same manner, when detecting using only the frames having the same sign of 4 bits or more, the probability of the synchronization information being detected correctly is;

$$\frac{P^5 + 5P^4(1-P)}{P^5 + 5P^4(1-P) + (1-P)^5 + 5(1-P)^4 P}, \quad (8)$$

And the ratio of frames to be extracted is;

$$P^5+5P^4(1-P)+(1-P)^5+5(1-P)^4P \quad (9),$$

Where the probability P is assumed not to depend on the position.

Figure 12:
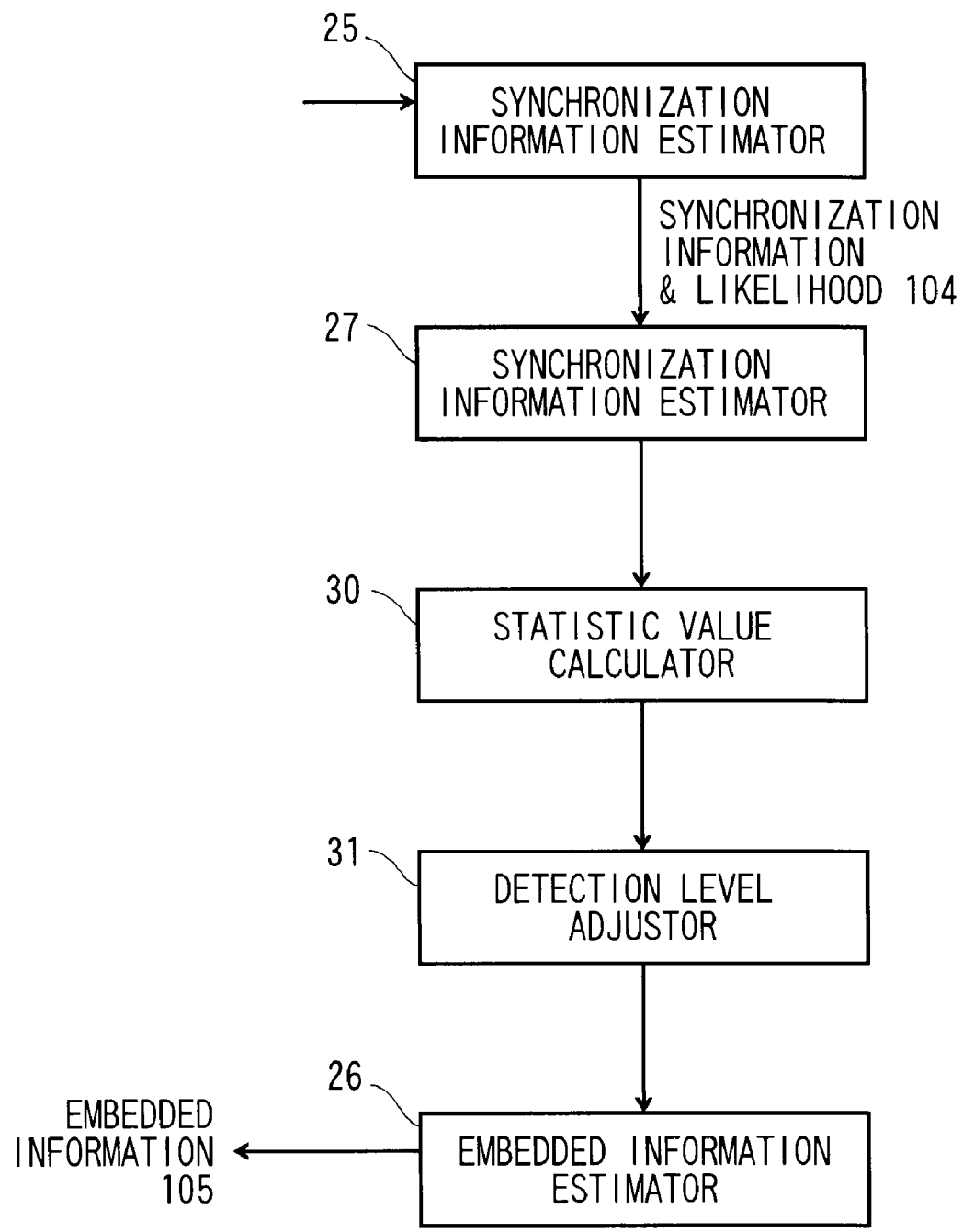
FIG. 12 is a block diagram showing a configuration of the detecting apparatus according to the fifth embodiment.
Figure 20:
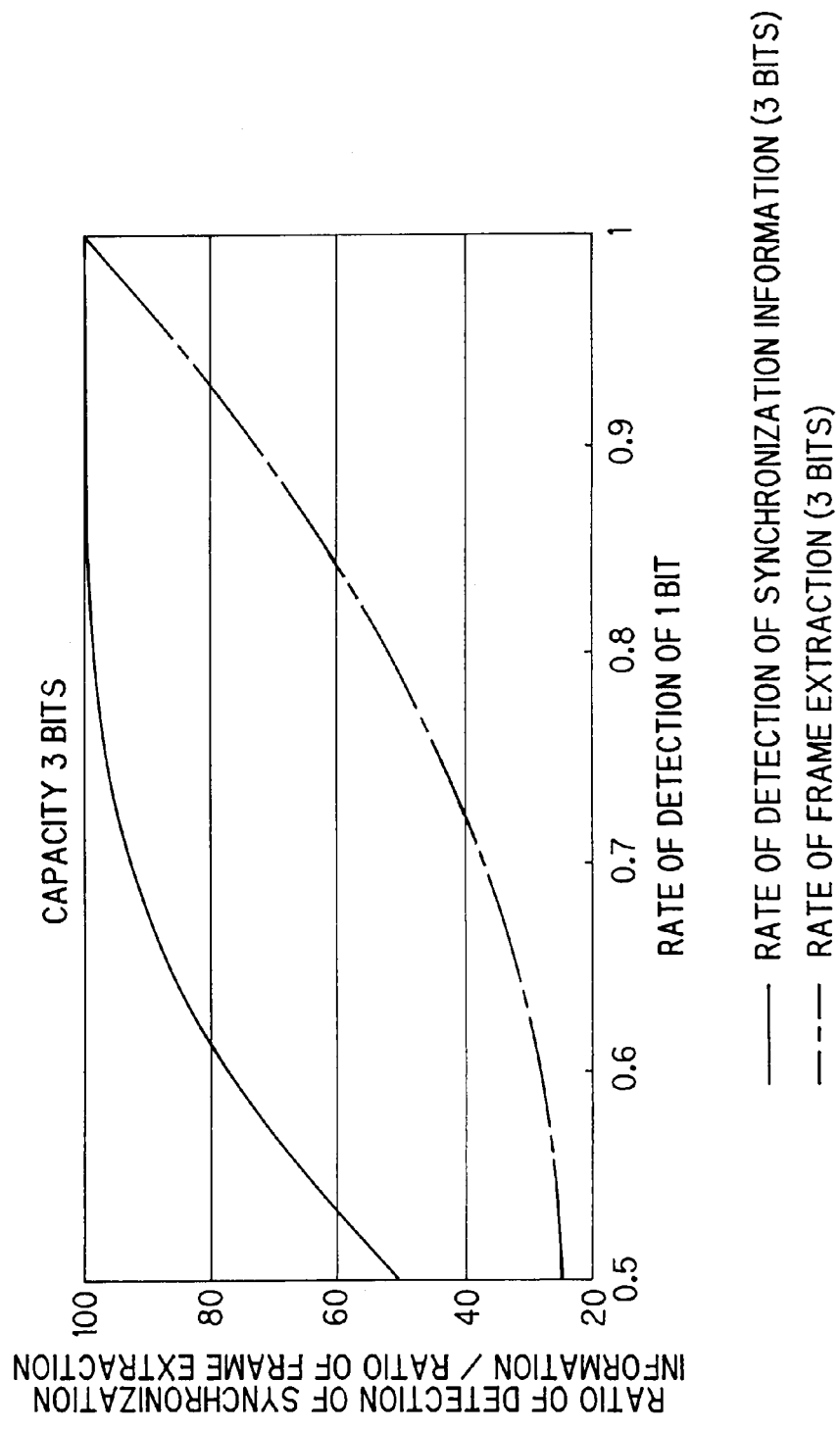
FIG. 20 is a drawing for explaining an error correction (capacity: 3 bits) according to the first embodiment.
Figure 21:
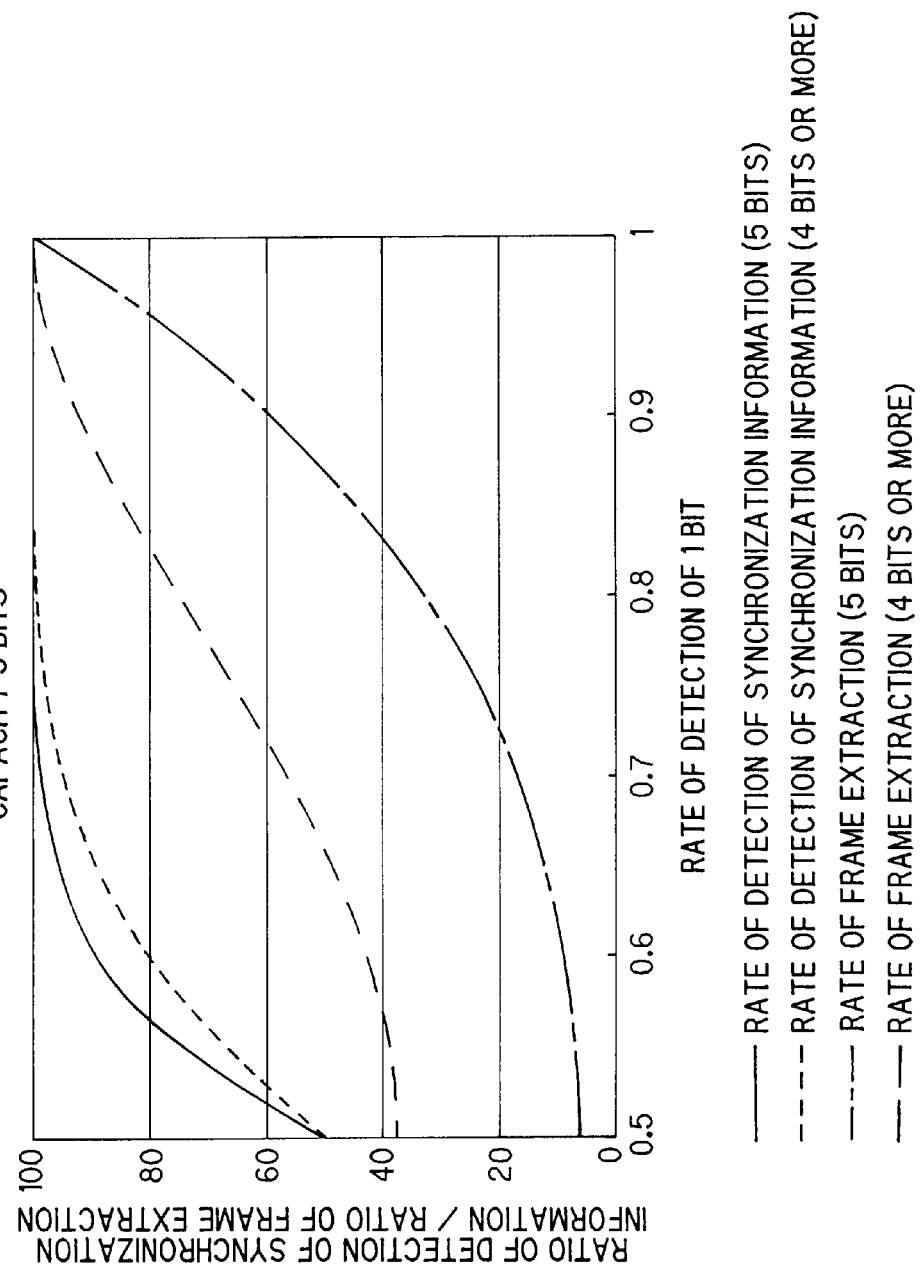
FIG. 21 is a drawing for explaining an error correction (capacity: 5 bits) according to the first embodiment.

FIG. 20 and FIG. 21 show the relation of the detection ratio. FIG. 20 shows an example in a case in which the capacity is 3 bits, and it is understood that a steep synchronization information detection ratio is obtained in comparison with the error correction in the first embodiment, however, the ratio of the frames to be extracted (the ratio of frame extraction) is very low. In the same manner, FIG. 12 shows an example in which the capacity is 5 bits, and a case of using only the frames having only the same sign for all the five bits (five bits) and a case of using only the frames having the same sign of 4 bits or more (4 bits or more). In this case as well, it is understood that the steep synchronization information detection ratio is obtained in comparison with the error correction in the first embodiment.

An example in which the error correction is performed using the majority logic has been described here, however, other error correction methods (or methods of error detection) may be used for performing the embedding and the detection.

Fourth Embodiment

Figure 9:
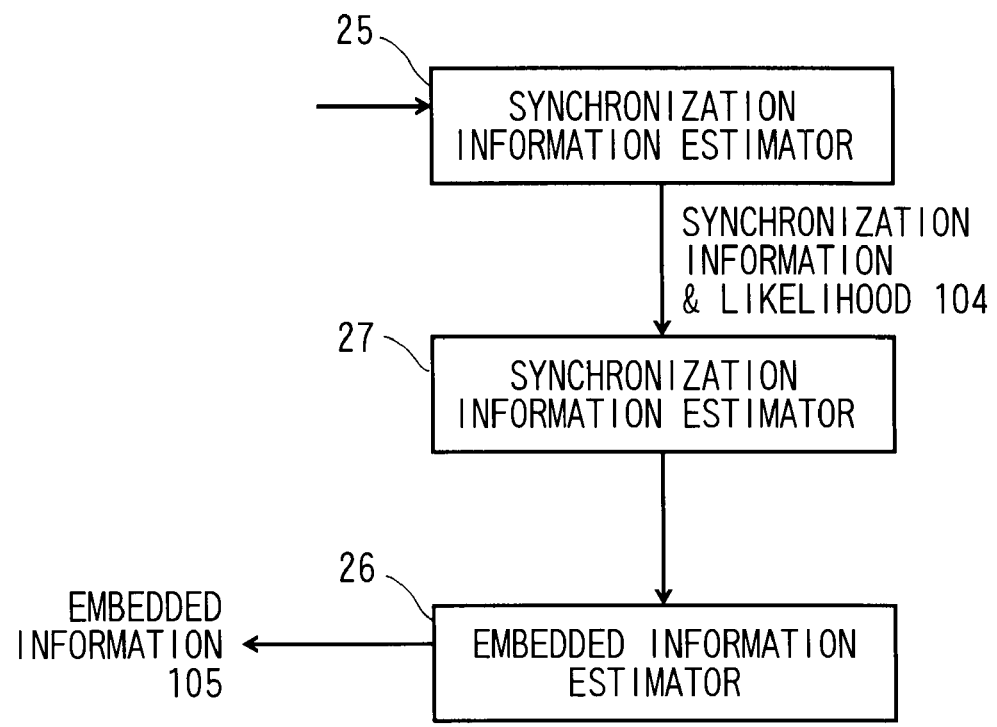
FIG. 9 is a block diagram showing a configuration of the detecting apparatus according to a fourth embodiment.

Referring now to FIG. 9, the detecting apparatus according to a fourth embodiment will be described.

The detecting apparatus estimates the embedded information on the basis of the synchronization information estimated on the frame-to-frame basis. However, the detection accuracy varies from frame to frame, and hence the utilization of the frame with low detection accuracy may affect adversely on the estimation of the embedded information.

Therefore, in the fourth embodiment, the performance of detection of embedded information is improved by estimating the embedded information using only the frames in which the energy of signal to be input in the synchronization information estimator 25 is high and the probability in the synchronization information extractor 27 is high.

Fifth Embodiment

Figure 10:
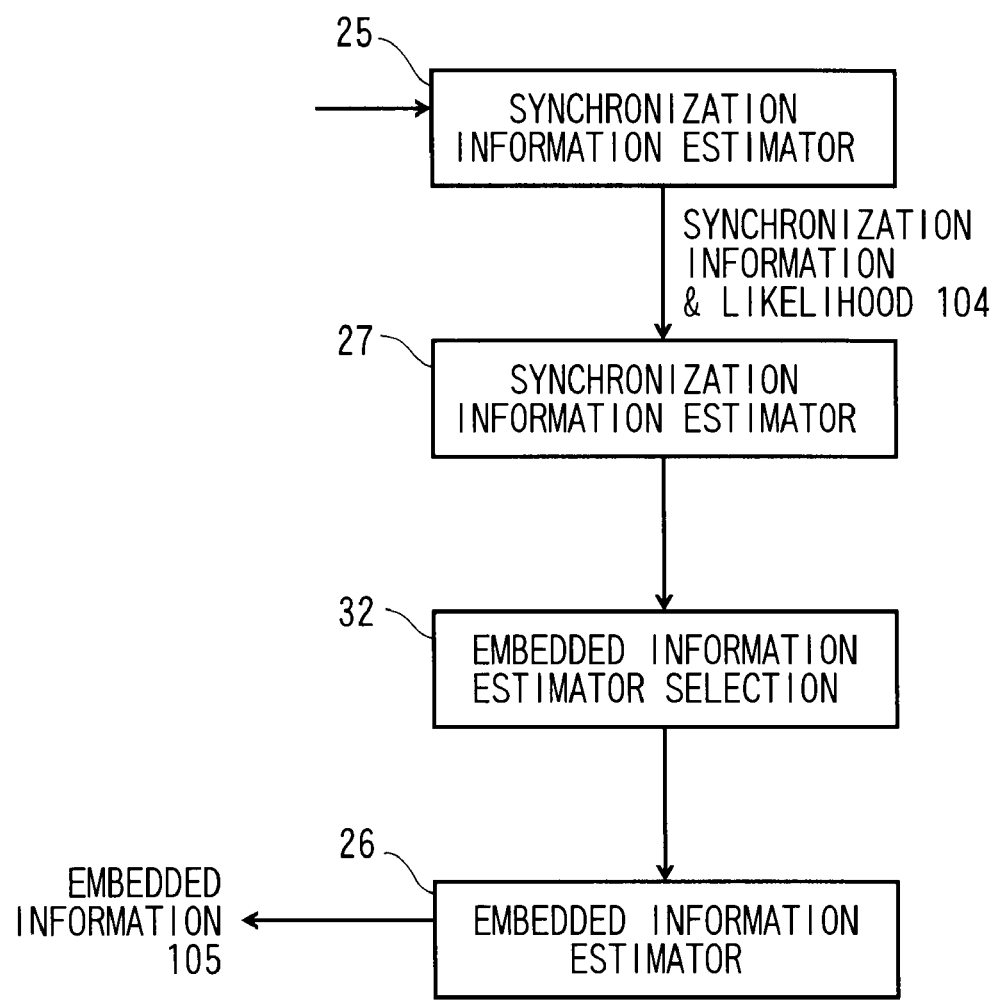
FIG. 10 is a block diagram showing a configuration of the detecting apparatus according to a fifth embodiment.

Referring now to FIG. 10, the detecting apparatus according to a fifth embodiment will be described.

The detecting apparatus estimates the embedded information on the basis of the synchronization information estimated on the frame-to-frame basis. However, the detection accuracy varies from frame to frame, and hence the utilization of the frame with low detection accuracy may affect adversely on the estimation of the embedded information.

Therefore, in the fifth embodiment, the method of estimating the embedded information is adjusted by an embedded information estimator selection 32 according to the frame extraction ratio when estimating the embedded information using only frames in which the energy of the image signal input to the synchronization information estimator 25 is high and the probability in the synchronization information extractor 27 is high.

Accordingly, an optimal method of estimating the embedded information can be used in the corresponding frame extraction ratio, so that the performance of detecting the embedded information is improved.

Sixth Embodiment

Figure 11:
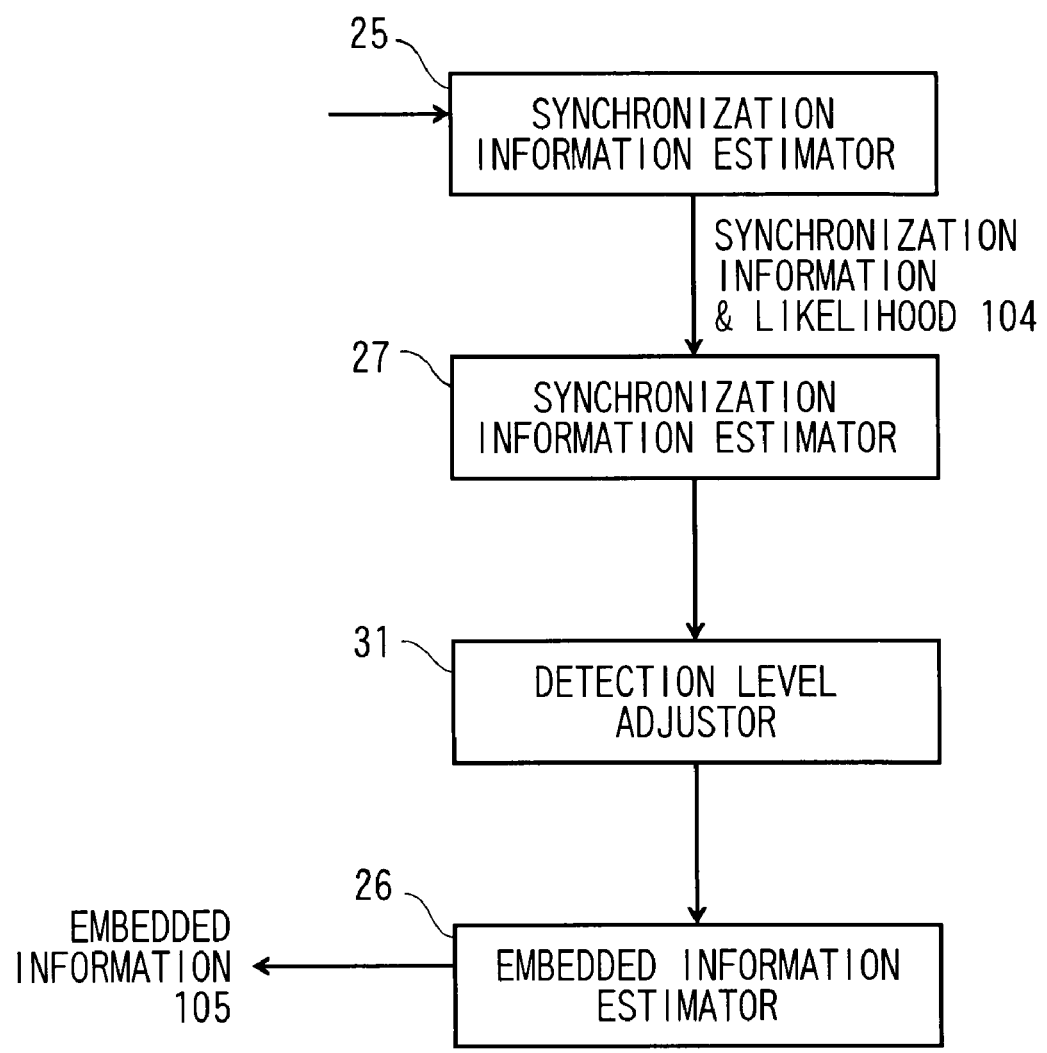
FIG. 11 is a block diagram showing a configuration of the detecting apparatus according to the fourth embodiment.

Referring now to FIG. 11, the detecting apparatus according to a sixth embodiment will be described.

When estimating the embedded information by the detecting apparatus, if an image having no watermark information embedded therein is input, there is a possibility to estimate that the watermark information is embedded by mistake on the detecting side.

Therefore, in the sixth embodiment, the detection level is adjusted by the detection level adjustor 31 according to the frame extraction ratio when estimating the embedded information using only frames in which the energy of image signal input to the synchronization information estimator 25 is high and the probability in the synchronization information extractor 27 is high.

Accordingly, it is possible to avoid the detecting side from estimating as if the watermark information is embedded for the image having no watermark information embedded therein by mistake.

More specifically, the erroneous detection is prevented by holding the frame extraction ratio when the image having no watermark information embedded therein is input as a threshold value in advance, and lowering the detection level when the frame extraction ratio is lower than the threshold value.

Seventh Embodiment

Referring now to FIG. 12, the detecting apparatus according to a seventh embodiment will be described.

When estimating the embedded information by the detecting apparatus, if an image having no watermark information embedded therein is input, there is a possibility to estimate that the watermark information is embedded by mistake on the detecting side.

Therefore, in the seventh embodiment, statistic values (for example, average or dispersion) of the frame extraction ratio in the past is calculated by a statistic value calculator 30 and the detection level is adjusted by the detection level adjustor 31 according to the statistic value of the frame extraction ratio when estimating the embedded information using only frames in which the energy of the image signal to be input in the synchronization information estimator 25 is high and a probability in the synchronization information extractor 27 is high.

Accordingly, it is possible to avoid the detecting side from estimating as if the watermark information is embedded for the image having no watermark information embedded therein by mistake.

More specifically, the erroneous detection is prevented by holding the statistic values (for example, average or dispersion) in the past of the frame extraction ratio when the image having no watermark information embedded therein is input as a threshold value in advance, and lowering the detection level when the statistic values of the frame extraction ratio is lower than the threshold value.

Example of Operation for Embedding/Detecting Watermark

Referring now to FIG. 15 to FIG. 18, a detailed example of the operation when the 2 bits embedded information 101 is embedded into the image signal by the embedding apparatus in the second embodiment (FIG. 2) and the watermark information is detected by the detecting apparatus according to the second embodiment (FIG. 6) will be described.

Here, for simplification, description is given under the assumption that the scaling at the same magnification is performed in the scaling unit while ignoring the embedding and detection of the synchronization information. However, when embedding and detection of the synchronization information is performed, a case in which the scaling is not the same magnification may also be considered.

FIGS. 15A to 15E and FIGS. 16A to 16D each show a one-line signal of the image as an example, and hence a one-dimensional signal is illustrated.

The embedding apparatus in FIG. 2 will be described.

A specific frequency component signal (image of a specific frequency component) shown in FIG. 15B is extracted from the image for embedding 100 by a digital filter or the like.

Then, the specific frequency component signal is shifted in phase by a predetermined shift amount determined in advance by two phase shifters.

Then, the phase shift signal is multiplied by a factor expressing the $0^{th}$ bit and the first bit of the embedded information 101. For example, when the embedded information 101 is "0", the phase shift signal is multiplied by −1, and when it is "1", the phase shift signal is multiplied by "+1". FIGS. 15C and 15D each show a phase shift signal when the watermark information is (1, 1). Since the phase of the image corresponds to the position of the image, the phase shift represents the movement of the position in the screen. In FIGS. 15C and 15D, the position of the signal of the specific frequency component signal is different from that of the phase shift signal 1 due to the phase shift, and hence positions of the peaks present at the leftmost position of the signal are different. The difference of the peak position is caused by the phase being shifted.

Then, the phase shift signal multiplied by the factor for bit expression is added to the image for embedding 100 by the superimposer 13, so that the embedded image 103 shown in FIG. 15E is generated. A solid line in FIG. 15E represents the embedded image 103, and a waveform shown in FIG. 15A is a waveform obtained by adding and synthesizing the image for embedding 100 and the phase shift signals shown in FIGS. 15C and 15D.

A case in which the watermark information is detected from the embedded image 103 having the embedded information 101 embedded therein by the detecting apparatus in FIG. 6 in a manner shown in FIGS. 15A to 15E will be described.

First of all, a specific frequency component signal shown in FIG. 16B is extracted from the embedded image 103 (corresponding to the embedded image shown in FIG. 15E) shown in FIG. 16A by digital filtering or the like.

A case in which the embedded image 103 is not subjected to the scaling attack will be described.

The embedded image 103 is shifted in phase by a predetermined shift amount which is the same as those shown in FIGS. 15C and 15D by the phase shifter as shown in FIGS. 16C and 16D.

Then, the correlation value of the embedded image 103 and the phase shift signal is obtained, and the embedded information is determined from the peak of the correlation value. For example, when the peak of the correlation value is a positive value, the embedded information is determined as +1 ("1"), and when the peak of the correlation value is a negative value, the embedded information is determined as −1 ("0").

A case in which the embedded image 103 is subjected to the scaling attack will be described.

Figure 17:
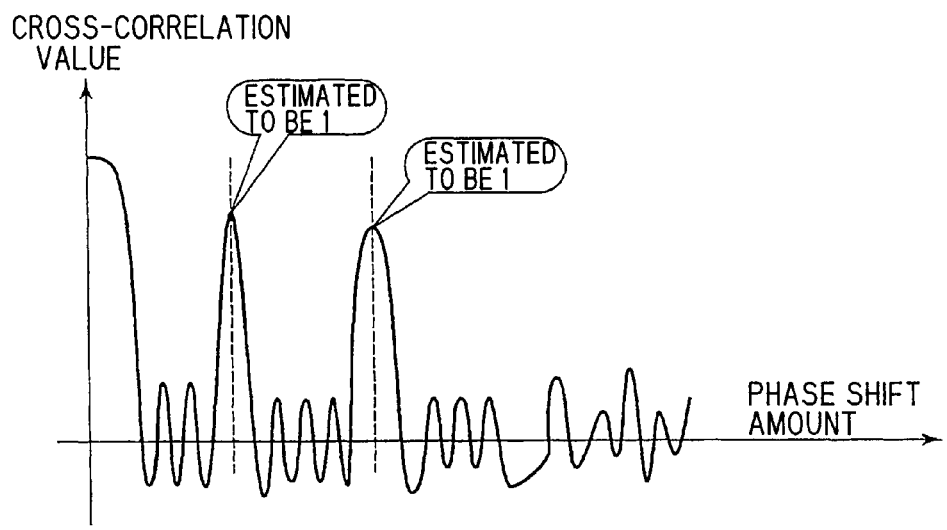
FIG. 17 is a drawing showing an example of operations of correlation value peak search and watermark information detection when the watermark information is (1, 1) in the detecting apparatus in FIG. 5.
Figure 18:
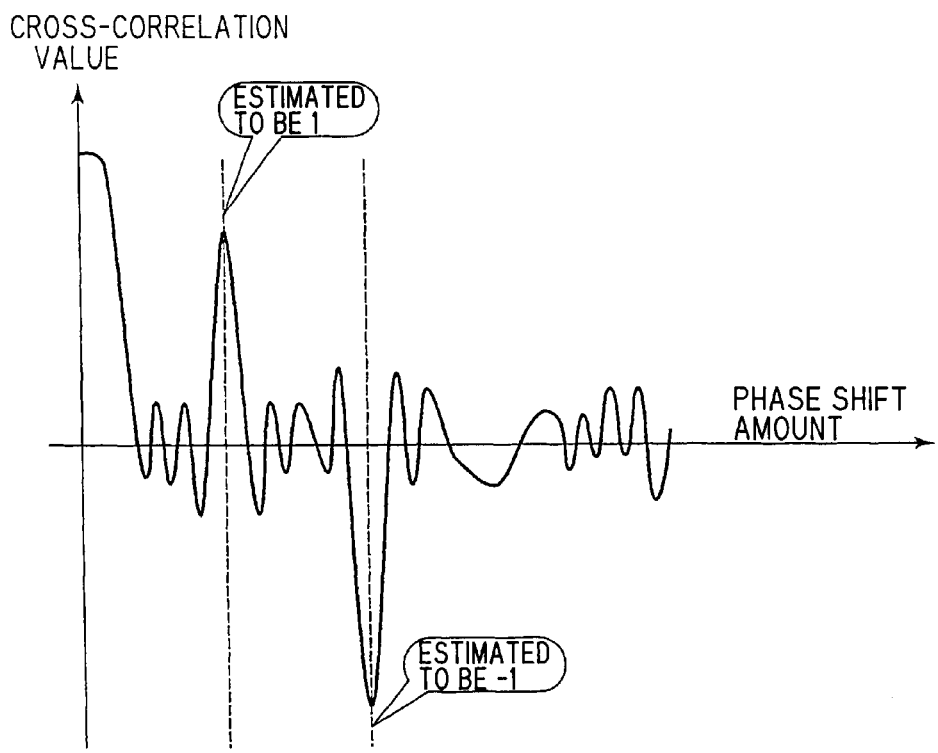
FIG. 18 is a drawing showing an example of operations of correlation value peak search and watermark information detection when the watermark information is (1, −1) in the detecting apparatus in FIG. 5.

The phase shift amount is searched by the phase shift amount controlled in the same manner as described in conjunction with FIG. 14. In other words, the peak of the correlation value is searched by the embedded information estimator 26 in association with the control of the phase shift amount, and the embedded information 101 is estimated from its peak position. For example, when the embedded information 101 is (1, 1), the positive peaks of the correlation value are present at two positions other than the original point (a point where the phase shift amount is zero) as shown in FIG. 17, so that the embedded information is determined. When the embedded information is (1, −1), the positive peak of the correlation value is present at a position near the original point as shown in FIG. 18, and the negative peak is present at a position farther from the original point in comparison with the positive peak, so that the embedded information is determined.

(Modification)

The invention is not limited to the embodiments shown above, and may be embodied by modifying the components without departing the scope of the invention. The invention may be modified in various manners by combining the plurality of components disclosed in the embodiments shown above adequately. For example, some components may be eliminated from all the components shown in the embodiments. Furthermore, the components from different embodiments may be combined as needed.

For example, FIGS. 15A to 15E and FIGS. 16A to 16D each show a one-line signal of the image as an example, and hence a one-dimensional signal is illustrated. However, a system in which the polarity of the phase shift signal is inverted by any of line-to-line basis, every plural lines, field-to-field basis, every plural fields, frame-to-frame basis, and every plural frames or by an adequate combination thereof when preparing the embedded image 103 by adding the specific frequency component signal to the image for embedding is also applicable. Alternatively, a system to laterally invert the phase shift amount on the line-to-line basis is also applicable.

INDUSTRIAL APPLICABILITY

The invention is suitable for an apparatus for recording and regenerating the digital image data such as a digital VTR or a DVD.

What is claimed is:

1. A digital watermark detecting apparatus comprising:
   a scaling unit configured to enlarge or contract an input image signal having N kinds of embedded information embedded therein at N kinds of different enlargement ratios or contracting ratios to generate N kinds of scaled images, wherein N>1;
   an extractor configured to generate N kinds of extracting signals by extracting specific frequency component signals respectively from the N kinds of scaled images;
   a first orthogonal transformer configured to perform an orthogonal transform on the input image signal to generate a first transforming signal;
   a second orthogonal transformer configured to perform the orthogonal transform on the N kinds of extracted signals respectively to generate N kinds of second transforming signals;
   a synthesizer configured to synthesize the first transforming signals and the N kinds of second transforming signals respectively to generate N kinds of synthesized images;
   a third orthogonal transformer configured to perform the orthogonal transform or inverted orthogonal transform on the N kinds of synthesized images respectively to generate N kinds of third transforming signals; and
   an estimator configured to estimate the N kinds of embedded information from peaks appearing in the N kinds of third transforming signals.

2. The apparatus according to claim 1, wherein the N kinds of embedded information includes S types of watermark information and R types of synchronization information, wherein S>0, R>0, and N=S+R,
   the N kinds of watermark image signals include S kinds of first watermark image signals on the basis of the respective watermark information and R kinds of second watermark image signals on the basis of the respective synchronization information, and
   the first watermark image signals are added to the respective frames of the input image signal at a polarity according to the synchronization information, and the second watermark image signals are added to the respective frames.

3. The apparatus according to claim 2, wherein the estimator detects the synchronization information using an error detecting function or an error correcting function.

4. The apparatus according to claim 2, wherein the estimator estimates the embedded information using only frames in which energy of the input image signal is high and probability in which the embedded information is embedded is high.

5. The apparatus according to claim 4, wherein the estimator lowers a detection level of frames having a high accuracy when an extraction ratio of the frames having a high accuracy is lower than a threshold value.

6. The apparatus according to claim 4, wherein the estimator calculates statistic values in a plurality of frames in the past relating to an extraction ratio of the frames having a high accuracy, and
   lowers a detection level of the frames having a high accuracy when the statistic value is lower than the threshold value.

7. A method of detecting a digital watermark comprising:
   enlarging or contracting an input image signal having N kinds of embedded information embedded therein at N kinds of different enlargement ratios or contracting ratios, wherein N>1;
   generating N kinds of extracting signals by extracting specific frequency component signals respectively from the N kinds of scaled images;
   performing an orthogonal transform on the input image signal to generate a first transforming signals;
   performing the orthogonal transform on the N kinds of extracted signals respectively to generate N kinds of second transforming signal;
   synthesizing the first transforming signals and the N kinds of second transforming signals respectively to generate N kinds of synthesized images;
   performing the orthogonal transform or inverted orthogonal transform on the N kinds of synthesized images respectively to generate N kinds of third transforming signals; and
   estimating the N kinds of embedded information from peaks appearing in the N kinds of third transforming signals.

8. The method according to claim 7, wherein the N kinds of embedded information include S types of watermark information and R types of synchronization information, wherein S>0, R>0, and N=S+R,
   the N kinds of watermark image signals include S kinds of first watermark image signals on the basis of the respective watermark information and R kinds of second watermark image signals on the basis of the respective synchronization information, and
   the first watermark image signals are added to the respective frames of the input moving image at a polarity according to the synchronization information, and the second watermark image signals are added to the respective frames.

9. The method according to claim 8, wherein the synchronization information is detected using an error detecting function or an error correcting function in the estimating.

10. The method according to claim 8, wherein the embedded information is estimated using only frames in which energy of the input image signal is high and probability in which the embedded information is embedded is high in the estimating.

11. The method according to claim 10, wherein a detection level of frames having a high accuracy is lowered when an extraction ratio of the frames having a high accuracy is lower than a threshold value in the estimating.

12. The method according to claim 10, wherein statistic values in a plurality of frames are calculated in the past relating to an extraction ratio of the frames having a high accuracy, and
   a detection level of the frames having a high accuracy is lowered when the statistic value is lower than the threshold value in the estimating.

* * * * *